(12) United States Patent
Brannon et al.

(10) Patent No.: US 6,508,305 B1
(45) Date of Patent: Jan. 21, 2003

(54) COMPOSITIONS AND METHODS FOR CEMENTING USING ELASTIC PARTICLES

(75) Inventors: Harold D. Brannon, Spring; Christopher J. Stephenson, Houston; Robert L. Dillenbeck, Spring; Dan T. Mueller, Cypress, all of TX (US)

(73) Assignee: BJ Services Company, Houston, TX (US)

(*) Notice: Subject to any disclaimer, the term of this patent is extended or adjusted under 35 U.S.C. 154(b) by 22 days.

(21) Appl. No.: 09/662,074

(22) Filed: Sep. 14, 2000

Related U.S. Application Data

(60) Provisional application No. 60/154,251, filed on Sep. 16, 1999.

(51) Int. Cl.[7] .............................................. E21B 33/13
(52) U.S. Cl. ...................................... 166/293; 106/607
(58) Field of Search .............................. 166/244.1, 285, 166/292, 293; 106/606, 607

(56) References Cited

U.S. PATENT DOCUMENTS

| | | |
|---|---|---|
| 3,089,542 A | 5/1963 | Kolodny |
| 3,155,159 A | 11/1964 | McGuire et al. |
| 3,254,064 A | 5/1966 | Nevins ...................... 260/87.7 |
| 3,363,690 A | 1/1968 | Fischer |
| 3,387,888 A | 6/1968 | Shock et al. .................... 299/4 |
| 3,481,401 A | 12/1969 | Graham ....................... 166/280 |
| 3,492,147 A | 1/1970 | Young et al. |
| 3,563,313 A | 2/1971 | Spangle ....................... 166/292 |
| 3,581,825 A | 6/1971 | Messenger ................... 166/288 |
| 3,659,651 A | 5/1972 | Graham ....................... 166/280 |

(List continued on next page.)

FOREIGN PATENT DOCUMENTS

| | | |
|---|---|---|
| EP | 1001133 A1 | 5/1900 |
| EP | 0 771 935 A1 | 5/1997 |
| EP | 0 853 186 A2 | 7/1998 |
| EP | 0 859 125 A1 | 8/1998 |
| EP | 0 879 935 A2 | 11/1998 |
| EP | 0 933 498 A1 | 8/1999 |
| GB | 0920446 A | 3/1963 |
| GB | 994377 | 6/1965 |
| GB | 1469954 A | 4/1977 |
| GB | 2319 796 A | 6/1998 |
| JP | 10216628 A | 2/1997 |
| SU | 1636367 A | 3/1991 |
| WO | WO 89/02878 | 4/1989 |
| WO | WO 96/04464 | 2/1996 |
| WO | WO 99/27229 | 6/1999 |
| WO | WO 00/20350 | 4/2000 |
| WO | WO 00/37387 | 6/2000 |

OTHER PUBLICATIONS

"Well Cementing," Erik B. Nelson ed., Schlumberger Educational Services, Elsevier Science Publishing Company Inc., 1990, pp. 3–31 to 3–35.

K.R. Backe, "Characterizing Curing–Cement Slurries By Permeability, Tensile Strength and Shrinkage," SPE Drill & Completions 14, Norwegian U. of Science and Technology, Sep. 3, 1999, pp. 162–167.

Hogg, "Comparison of Multilateral Completion Scenarios and Their Application, " SPE 38493, Society of Petroleum Engineers, Inc.; Offshore Europe Conference held in Aberdeen, Scotland, Sep. 9–12, 1997.

(List continued on next page.)

Primary Examiner—Roger Schoeppel
(74) Attorney, Agent, or Firm—O'Keefe, Egan & Peterman, LLP

(57) ABSTRACT

Cement compositions including mixtures of substantially elastic material and cement that may be formulated exhibit reduced bulk volume shrinkage during curing as compared to conventional cement compositions. In one application, such cement compositions may be used for cementing in substantially closed system, such as the interior of a mold used for producing preformed concrete items.

43 Claims, 10 Drawing Sheets

U.S. PATENT DOCUMENTS

| | | | |
|---|---|---|---|
| 3,677,941 A | 7/1972 | Mazzara et al. | 252/8.55 R |
| 3,887,385 A | 6/1975 | Quist et al. | 106/96 |
| 3,888,311 A | 6/1975 | Cooke, Jr. | 166/280 |
| 3,917,345 A | 11/1975 | Davidson et al. | 299/5 |
| 3,929,191 A | 12/1975 | Graham et al. | 166/276 |
| 3,998,744 A | 12/1976 | Arnold et al. | 252/8.55 R |
| 4,049,866 A | 9/1977 | Lane et al. | 428/402 |
| 4,102,400 A | 7/1978 | Crinkelmeyer et al. | 166/283 |
| 4,132,555 A | 1/1979 | Barrable | 106/90 |
| 4,137,182 A | 1/1979 | Golinkin | 252/8.55 |
| 4,159,361 A * | 6/1979 | Schupack | |
| 4,193,453 A | 3/1980 | Golinkin | 166/295 |
| 4,202,413 A | 5/1980 | Messenger | 166/292 |
| 4,257,483 A | 3/1981 | Morris et al. | 166/292 |
| 4,274,881 A | 6/1981 | Langton et al. | 106/98 |
| 4,300,633 A | 11/1981 | Stewart | 166/250 |
| 4,328,036 A | 5/1982 | Nelson et al. | 106/85 |
| 4,478,640 A | 10/1984 | Holland | 106/76 |
| 4,482,379 A | 11/1984 | Dibrell et al. | 106/76 |
| 4,518,039 A | 5/1985 | Graham et al. | 166/276 |
| 4,527,627 A | 7/1985 | Graham et al. | 166/280 |
| 4,531,594 A | 7/1985 | Cowan | 175/72 |
| 4,640,361 A | 2/1987 | Smith et al. | 166/288 |
| 4,655,286 A * | 4/1987 | Wood | |
| 4,664,619 A | 5/1987 | Johnson et al. | 431/154 |
| 4,664,819 A | 5/1987 | Glaze et al. | 252/8.551 |
| 4,779,680 A | 10/1988 | Sydansk | 166/300 |
| 4,869,960 A | 9/1989 | Gibb et al. | 428/405 |
| 4,902,170 A | 2/1990 | Knox et al. | 405/225 |
| 4,957,556 A | 9/1990 | Kunbargi | 106/693 |
| 4,967,839 A * | 11/1990 | Carpenter et al. | |
| 4,968,349 A | 11/1990 | Virtanen | 106/707 |
| 4,969,523 A | 11/1990 | Martin et al. | 166/278 |
| 5,028,271 A | 7/1991 | Huddleston et al. | 106/720 |
| 5,058,679 A | 10/1991 | Hale et al. | 166/293 |
| 5,106,423 A | 4/1992 | Clarke | 106/789 |
| 5,125,455 A | 6/1992 | Harris et al. | 166/292 |
| 5,158,613 A | 10/1992 | Sargeant et al. | 106/737 |
| 5,159,980 A | 11/1992 | Onan et al. | 166/294 |
| 5,180,020 A | 1/1993 | Fuh | 175/72 |
| 5,183,506 A | 2/1993 | Zhang | 106/739 |
| 5,207,282 A | 5/1993 | Fuh | 175/72 |
| 5,251,697 A | 10/1993 | Shuler | 166/268 |
| 5,271,469 A * | 12/1993 | Brooks et al. | |
| 5,293,938 A | 3/1994 | Onan et al. | 166/293 |
| 5,330,005 A | 7/1994 | Card et al. | 166/280 |
| 5,343,950 A | 9/1994 | Hale et al. | 166/293 |
| 5,348,093 A * | 9/1994 | Wood et al. | |
| 5,351,759 A | 10/1994 | Nahm et al. | 166/293 |
| 5,381,864 A | 1/1995 | Nguyen et al. | 166/280 |
| 5,420,174 A | 5/1995 | Dewprashad | |
| 5,421,409 A | 6/1995 | Mueller et al. | 166/292 |
| 5,422,183 A | 6/1995 | Sinclair et al. | 428/403 |
| 5,439,055 A | 8/1995 | Card et al. | 166/280 |
| 5,439,059 A | 8/1995 | Harris et al. | 166/300 |
| 5,484,019 A | 1/1996 | Griffith | 166/293 |
| 5,492,178 A | 2/1996 | Nguyen et al. | 166/276 |
| 5,501,274 A | 3/1996 | Nguyen et al. | 166/276 |
| 5,501,275 A | 3/1996 | Card et al. | 166/280 |
| 5,531,274 A | 7/1996 | Bienvenu, Jr. | 166/280 |
| 5,564,503 A | 10/1996 | Longbottom et al. | 166/313 |
| 5,569,324 A | 10/1996 | Totten et al. | 106/696 |
| 5,571,318 A | 11/1996 | Griffith et al. | 106/725 |
| 5,582,249 A | 12/1996 | Caveny et al. | 166/276 |
| 5,588,488 A | 12/1996 | Vijn et al. | 166/293 |
| 5,604,186 A | 2/1997 | Hunt et al. | 507/204 |
| 5,641,018 A * | 6/1997 | King | |
| 5,660,625 A | 8/1997 | Helmboldt et al. | 106/736 |
| 5,688,844 A | 11/1997 | Chatterji et al. | 524/8 |
| 5,697,440 A | 12/1997 | Weaver et al. | 166/281 |
| 5,705,237 A * | 1/1998 | Andersen et al. | |
| 5,711,383 A | 1/1998 | Terry et al. | 175/72 |
| 5,711,801 A | 1/1998 | Chatterji et al. | 106/789 |
| 5,775,425 A | 7/1998 | Weaver et al. | 166/276 |
| 5,779,787 A | 7/1998 | Brothers et al. | |
| 5,787,986 A | 8/1998 | Weaver et al. | 166/280 |
| 5,806,594 A * | 9/1998 | Stiles et al. | |
| 5,833,000 A | 11/1998 | Weaver et al. | 166/276 |
| 5,837,656 A | 11/1998 | Sinclair et al. | |
| 5,839,510 A | 11/1998 | Weaver et al. | 166/276 |
| 5,851,960 A | 12/1998 | Totten et al. | 507/118 |
| 5,955,144 A | 9/1999 | Sinclair et al. | |
| 5,964,295 A | 10/1999 | Brown et al. | 166/308 |
| 6,016,869 A | 1/2000 | Burts, Jr. | 166/295 |
| 6,016,870 A | 1/2000 | Dewprashad et al. | 166/295 |
| 6,059,034 A | 5/2000 | Rickards et al. | 166/280 |
| 6,145,591 A | 11/2000 | Go Boncan et al. | 166/291 |
| 6,230,804 B1 | 5/2001 | Mueller et al. | 166/293 |

OTHER PUBLICATIONS

Morsy, et al., "Microstructure and Hydration Characteristics of Artificial Pozzolana–Cement Pastes Containing Burnt Kaolinite Clay," Cement and Concrete Research, 27(9), 1307, 1997.

"MetaMax® High Reactivity Metakaolin (HRM) for Improved Pre–cast Concrete," Engelhard Corporation Pigments and Additives Group, C–8–E, Jan. 1997, 7 pages.

Thiercelin, et al. "Cement Design Based on Cement Mechanical Response," SPE 38598, Society of Petroleum Engineers, Inc.; SPE Annual Technical Conference and Exhibition held in San Antonio, Texas, Oct. 5–8, 1997.

Marsh, "An alternative to silica fume?" Concrete Products, EC–6729, Nov. 1994.

"Horizontal Drilling: Multi–Lateral and Twinned Wells," Sperry–Sun Drilling Services, 1993.

Low, et al., "The Flexural Toughness and Ductility of Portland Cement–Based Binders Reinforced With Wollastonite Micro–Fibres," Cement and Concrete Research, 24(2), 250, 1994.

Low, et al., "Flexural Strength and Microstructure of Cement Binders Reinforced With Wollastonite Micro–Fibres," 10 pages.

Rieger, et al., "Talc, Pyrophyllite, and Wollastonite", pp. 38–40, 42–44.

M–90–339 Silicate Portland Cement Admixture, Engelhard Corporation, Specialty Minerals and Colors.

Ratinov, et al., "Chap. 8—Antifreezing Admixtures" in Concrete Admixtures Handbook, Properties, Science, and Technology, Edited by V. S. Ramchandran, pp. 430–463, 1984.

Ramachandran, V.S., "Concrete Admixtures Handbook Properties, Science, and Technology," Noyes Publications, Library of Congress No. 84–4125 (1984).

Caldarone et al., "High–Reactivity Metakaolin: A New Generation Mineral Admixture," 6 pages (authorized reprint from: Nov. 1994 issue of Concrete International).

Engelhard Corporation "MetaMax® EF High Reactivity Metakaolin (HRM) Pozzolanic Mineral Admixture"2 pages (1997).

Engelhard "What Makes MetaMax® High Reactivity Metakaolin Stand Out? Let Us Enlighten You" 1 page, (1996).

Kuennen, "Metakaolin might" Concrete Products, 4 pages (May 1996).

Gruber et al., "Exploring The Pozzolanic Activity of High Reactivity Metakaolin," World Cement Research and Development, 6 pages (Feb. 1996).

Improve Cement–Based Products with High Reactivity Metakaolin 2 pages.

Khatib et al., "Sulphate Resistance of Metakaolin Mortar," Cement and Concrete Research, vol. 28, No. 1 pp. 83–92 (1998).

American Petroleum Institute, "Cement Sheah Evaluation" API Technical Report 10TR1 First Edition (Jun. 1996).

Thrush, "A dictionary of mining, mineral, and related terms," compiled and edited by Paul W. Thrush and the Staff of the Bureau of Mines, [Washington] U.S. Department of the Interior, Bureau of Mines, pp. 162, 606 and 696, (1968).

Suman, et al. "World Oil Cementing Hand Book" (1977).

Jutten, et al., Dowell Schlumberger, "Relationship Between Cement Composition, Mechanical Properties and Cement–Bond–Log Output", SPE 16652, pp. 75–82 (Feb. 1989).

Parcevaux, et al., "Cement Shrinkage and Elasticity: A New Approach for A Good Zonal Isolation"SPE 13176, (1984).

Goodwin, Mobil E&P Services Inc. and R.J. Crook, Halliburton, Services, "Cement Sheath Stress Failure"SPE 20453 (Dec. 1992).

Carpenter, et al., Arco Oil & Gas Co., "Effects of Temperature and Cement Admixes on Bond Strength" SPE 22063 (May 31, 1991).

Eilers, et al., "High Temperature Cement Compositions: Pectolite, Scawtite, Truscotite or Xonolite, Which Do You Want?"SPE 9286 (Jul. 1983).

International Search Report dated Dec. 4, 2000 (UK counterpart to U. S. patent application Ser. No. 09/662,074 filed May 25, 2000.

Mueller, "An Evaluation of Well Cements for Use in High Stress Environments," Hart's Petroleum Engineer International, pp. 91–93 (Apr. 1998).

BJ Services, "FlexSand™ Proppant Pack Enhancement Additive" Ad, Mar. 2000 issue of Journal of Petroleum Technology.

U.S. patent application Ser. No. 09/644,490 entitled "Methods and Compositions for Use in Cementing in Cold Environments" by Virgilio C. Go Boncan on Aug. 23, 2000 (BJSC:284).

U.S. patent application Ser. No. 09/519,238 entitled "Formation Treatment Method Using Deformable Particles"by Rickards et al., filed on Mar. 6, 2000 (BJSC:288).

U.S. patent application Ser. No. 09/579,146 entitled "Lightweight Methods and Compositions for Sand Control" by Brannon, et al., filed May 25, 2000 (BJSC:294).

U.S. patent application Ser. No. 09/579,147 entitled "Light Weight Methods and Compositions for Well Treating" by Brannon et al., filed May 25, 2000 (BJSC:295).

Martin, "Fracturing Recommendation" for Conoco State A 29#8, BJ Services, Feb. 4, 1999.

Martin, "Fracturing Recommendation"for Conoco State A 29#8, BJ Services, Feb. 5, 1999.

Treatment Report for Conoco State A 29#8, Feb. 11, 1999.

Invoice for treatment of Conoco State A 29#8, Feb. 11, 1999.

U.S. patent application Ser. No. 10/068,787 entitled "High Temperature Flexible Cementing Compostions and Methods for Using Same" on Feb. 6, 2002 (BJSC:296).

* cited by examiner

COMPOSITIONS AND METHODS FOR CEMENTING USING ELASTIC PARTICLES

The present application claims priority on co-pending U.S. provisional patent application serial No. 60/154,251 filed on Sep. 16, 1999. The entire text and all contents of the above-referenced disclosure is specifically incorporated herein by reference without disclaimer.

BACKGROUND OF THE INVENTION

1. Field of the Invention

This invention relates generally to cement compositions including mixtures of substantially elastic material and cement and, in one application, to methods for cementing using such cement compositions in substantially closed systems, such as the interior of a mold used for producing preformed concrete items.

2. Description of the Related Art

Cement inflatable packers were originally developed to provide isolation in open holes for stimulation treatments and for water shutoff. Today these packers are being used as an integral part of completion operations to, among other things, provide zonal isolation, control gas migration, isolating the junctions of multilateral completions, and for gravel packing. However, the success rate associated with inflatable packer completions has typically been low. This low success rate has been attributed to, among other things, volumetric shrinkage of Portland cement which is typically employed to inflate cement inflatable packers.

A typical inflatable packer has an annular elastomer packer element mounted around a central tubular member. The elastomer packer element is adapted to receive cement slurry or other fluid, such as drilling mud, under pressure in such a way that the packer element is inflated and compressed between the inflation liquid and the wall of a wellbore. During use, such an inflatable packer is typically run into a wellbore on a pipe string and positioned at a selected setting depth within the wellbore. Once inflated by an inflation fluid, such as cement, a valve system is typically provided within the packer in order to isolate the inflation fluid under pressure inside the inflated elastomer packer element. When used to achieve zonal isolation, the trapped inflating pressure of the inflation fluid within the elastomer packer element must be sufficiently high to maintain a positive hydraulic seal between the exterior of the packer element and the borehole wall.

In typical completion operations, Portland cement is used to inflate the element of an inflatable packer. Typically, a Portland cement undergoes a reduction in volume of from about 2% to about 4.5% during curing or hydration. In well cementing applications not involving inflatable packers, this volume loss is often masked or compensated for by the fact that free water, available from subterranean formations, imbibes into the exposed setting cement. This offsets shrinkage and may even cause a slight expansion. However, in a substantially closed system, such as that present within an inflatable packer, this osmotic transfer of water does not occur. As a consequence, shrinkage and dimensional changes of conventional Portland cement upon curing within an elastomer packer element may result in lack of sufficient pressure or strain to maintain a positive seal. This may result in the formation of a microannulus or other zone of communication which permits pressure and/or fluid communication across one or more areas between the inflated packer element and the borehole wall. Therefore, cement dimensional changes within an inflatable packer have often been linked to various completion problems, including interzonal communication and migration of fluids, such as gas. Such problems typically require costly remedial efforts which may or may not be successful.

Other applications in which cement shrinkage and dimensional changes may have adverse effects include cement applications in other substantially closed systems, such as during annular cementing of concentric strings of pipe in a wellbore. Such adverse effects may also result in the formation of a zone of communication which permits pressure and/or fluid communication across one or more areas in the annular space between the strings of pipe, resulting in various completion problems, including interzonal communication and fluid migration. Substantially closed systems and problems associated therewith may also be present in non-wellbore cementing applications as well.

In an effort to control or prevent cement shrinkage, additives have been developed which favor the expansion of cement. Such additives include materials such as salt, hemihydrated calcium sulfate, magnesium (calcium) oxide, and mixtures thereof. These additives typically require an extraneous source of water to effect expansion of the set cement. Therefore, even with these additives, most cement slurries will exhibit shrinkage under conditions where no access to external water is provided, such as those conditions found within an inflatable packer element. Magnesium oxide and magnesium (calcium) oxide additives used in sufficient concentrations with conventional cements may cause expansion without access to external water, but typically produce excess surface mixing viscosities, are difficult to retard under downhole conditions, and may deteriorate (i.e., exhibit cracking, excessive porosity, etc.) due to excessive increases in bulk volume, and/or uncontrolled expansion.

In an attempt to compensate for the lack of external water available to cement in a closed system, greater amounts of expanding agents (typically greater than 10% by weight) have been employed. However, a number of disadvantages are associated with these relatively high levels of expanding agent concentrations. Such disadvantages include shortened thickening times, excessive mixing viscosity, placement problems, downhole rheologies that create high friction during placement, and high cost. Gas generating additives may be employed to impart expansion, however these materials typically generate flammable gases. The effect of such gases on the long term stability of metal and/or sealing elements is unknown.

SUMMARY OF THE INVENTION

Disclosed herein are compositions and methods of cementing therewith. In one embodiment, a composition may include a mixture of hydraulic cement and a substantially elastic material, and a method of cementing may include placing an uncured cement composition in a selected location and allowing the cement composition to cure to form a cured cement composition; wherein the uncured cement composition includes a mixture of hydraulic cement and substantially elastic material. The substantially elastic material may be selected so that at least a portion of the substantially elastic material yields (i.e., deforms or compresses to a volume that is smaller than the volume of the elastic material in its non-compressed state) under conditions existing when the uncured cement composition is placed in the selected location. Such conditions may include, for example, exposure to pressure or other compressional forces present in the selected location when the uncured cement is placed in position. In one embodiment, the cured cement composition may be formulated to exhibit substantially the same to bulk volume upon curing in the absence of external water as the bulk volume of the uncured cement composition (or to exhibit a net shrinkage in bulk volume upon curing in the absence of external water of less than about 1% as compared to the bulk volume of the uncured cement composition).

In another respect, disclosed is a method of cementing within a wellbore, including introducing an uncured cement slurry into a wellbore, and allowing the cement slurry to cure to form a cured cement composition. In this method the uncured cement slurry may include a mixture of hydraulic cement and a particulate material, with the particulate material being substantially elastic under in situ cementing conditions. Furthermore, within the wellbore, at least a portion of the individual particles of the substantially elastic particulate material may each have a respective first volume at in situ wellbore cementing conditions prior to curing of the cement slurry; and may also each have a respective second volume at in situ wellbore cementing conditions after curing of the cement slurry to form the cured cement composition, with the second volume being larger than the first volume so as to at least partially counteract volumetric shrinkage of the cement slurry during curing.

In another respect, disclosed is a method of placing a cement composition within a substantially closed system (such as placing cement in an annular space existing between two concentric strings of pipe in a subterranean wellbore, or inflating an inflatable packer positioned within a subterranean wellbore). The method may include the step of introducing into the substantially closed system an uncured cement composition which includes a mixture of substantially elastic material (such as substantially elastic particulate material) and cement In one embodiment, individual particles of a substantially elastic material may have any size, shape, and/or configuration suitable for admixture and displacement with a cement composition, so that when present in an effective amount in the cement composition it is capable of exerting resilient or elastic force so as to be effective to at least partially counteract volumetric shrinkage of the cement composition during curing (e.g., by exerting resilient or elastic force in opposition to pressure or compressional forces existing within an inflatable packer). Advantageously, such substantially elastic particles may act to minimize shrinkage of cement upon curing by at least partially "rebounding" from a compressed or deformed shape induced by exposure of the elastic particles to pressure or other compressional forces present when the uncured cement is placed in position. Such rebounding may occur, due to the resilient or elastic force exerted by the substantially elastic material as pressure or other compressional forces decrease during curing of the cement (e.g., as may occur within a substantially closed system such as an inflatable packer)

In another respect, disclosed is a method of placing a cement composition within a substantially closed system, including the step of introducing into the substantially closed system a cement composition which includes a mixture of substantially elastic particulate material and cement. In this method, an effective amount of substantially elastic particulate material may be present in the composition so that the volume of cement composition including the substantially elastic particles and cement advantageously exhibits a volumetric shrinkage (i.e., final volume of cured cement relative to initial volume of uncured cement within the substantially closed system) during cement curing that is less than the volumetric shrinkage exhibited by a cement composition including the cement alone during cement curing.

In another respect, disclosed is a method of placing a cement composition within a substantially closed system, including the step of introducing into the substantially closed system a cement composition which includes a blend or mixture of substantially elastic particulate material and cement, the mixture may include between about 1% to about 50% substantially elastic particulate material by weight, alternatively from about 10% to about 40% substantially elastic particulate material, alternatively from about 10% to about 30% substantially elastic particulate material, alternatively from about 10% to about 20% substantially elastic particulate material, alternatively from about 20% to about 30% substantially elastic particulate material by weight of total weight of the cement composition. In one embodiment, at least a portion of the individual particles of the substantially elastic particulate material may include two or more components. In another embodiment, at least a portion of the individual particles of the substantially elastic particulate material may have a shape with a maximum length-based aspect ratio of equal to or less than about 5. In yet another embodiment, the substantially elastic particulate material may be substantially solid in structure, meaning that individual particles of a substantially elastic material have a structural matrix that is substantially uniform in physical composition and that contains substantially no micro structure and/or porosity. Where substantially no measurable porosity is present, a substantially elastic material may be characterized as being "substantially non-porous."

In another respect, disclosed is a method of placing a cement composition within a substantially closed system, including the step of introducing into the substantially closed system a cement composition which includes a mixture of substantially elastic particulate material and cement, wherein at least a portion of the individual particles of the substantially elastic particulate material include an agglomerate of substantially non-elastic material and one or more substantially elastic materials, a core of substantially non-elastic material surrounded by one or more layers of substantially elastic material, or a mixture thereof, and wherein the substantially elastic particulate material is capable of at least partially recovering size and/or shape after deformation caused by exposure to an external force, such as pressure or compressional forces, as described in further detail herein. The substantially elastic particulate material may be present in an amount effective to achieve one or more of the cement composition characteristics described elsewhere herein.

In another respect, disclosed is a method for inflating an inflatable packer coupled to a pipe suspended within a subterranean wellbore, and having at least one elastomeric packer element with an inner surface disposed in fluid communication with the string of pipe. The packer may be so inflated, for example, to obtain zonal isolation. The method may include expanding the packer element with an uncured cement slurry by pumping the uncured cement slurry down the string of pipe and into the packer element, and allowing the uncured cement slurry to cure within the expanded packer element to form a cured cement composition. The uncured cement slurry may include a mixture of hydraulic cement and a particulate material, the particulate material being substantially elastic under in situ cementing conditions; and the substantially elastic particulate material may be present in the uncured cement slurry in an amount effective to at least partially counteract volumetric shrinkage of the cement slurry during curing. In one embodiment, the packer element may be expanded sufficiently to form a positive seal between the packer element and a wall of the wellbore, and the uncured cement slurry allowed to cure so that the positive seal is maintained between the packer element and the wellbore wall after the cement slurry has cured to form the cured cement composition. The positive seal may advantageously be effective to substantially prevent gas migration and/or may advantageously be effective to substantially prevent a microannulus from existing between the packer element and the wellbore wall.

In another respect, disclosed is a method of inflating an inflatable packer positioned within a subterranean wellbore including the step of inflating the packer with an inflation fluid or cement composition which includes a mixture of substantially elastic particles or substantially elastic particulate material and cement. In this method, substantially elastic particulate material may be present in an amount effective to cause the pressure exerted on the elements of the inflatable packer by the cement composition including the substantially elastic particles during cement curing to be advantageously greater than the pressure exerted on the elements of the inflatable packer by an inflation fluid including the cement alone (i.e., without the effective amount of substantially elastic particulate material) during cement curing.

In another respect, disclosed is a cement composition that includes a mixture of substantially elastic particulate material and cement. In one embodiment, the cement composition may be a dry cement composition, including a mixture of hydraulic cement and substantially elastic material. In another embodiment, at least a portion of the individual particles of the substantially elastic particulate material may include a core of substantially non-elastic material surrounded by one or more layers of substantially elastic material. In another embodiment, the substantially elastic material may have a maximum length-based aspect ratio of equal to or less than about 5.

In another respect, disclosed herein are individual particles of substantially elastic particulate material that may be combined with hydraulic cement. The particles may have a shape with a maximum length-based aspect ratio of equal to or less than about 5. Such individual particles of substantially elastic particulate material may also have a shape that is at least one of beaded, cubic, bar-shaped, cylindrical, or a mixture thereof. In this regard, beaded or cylindrical shaped particulate materials may have a length to diameter aspect ratio of equal to or less than about 5, and bar-shaped particulate material may have a length to width aspect ratio of equal to or less than about 5 and a length to thickness aspect ratio of equal to or less than about 5. However, it will be understood with benefit of this disclosure that the above aspect ratios are exemplary only, and that in other embodiments, maximum length-based aspect ratio, as well as length to diameter, length to width, and/or length to thickness aspect ratios may be greater than about 5.

In another respect, disclosed herein are individual particles of substantially elastic particulate material that may be combined with hydraulic cement, and that may have a particle size of from about 4 mesh to about 500 mesh, a specific gravity of from about 0.4 to about 3.5, and a shape with a maximum length-based aspect ratio of equal to or less than about 5.

In another respect, disclosed herein are individual particles of substantially elastic particulate material that may be combined with hydraulic cement, and that may be included of a copolymer, such as a terpolymer, which may be at least one of polystyrene/vinyldivinyl benzene, acrylate-based terpolymer or a mixture thereof. For example, substantially elastic material may also be polystyrene divinylbenzene that includes from about 0.5% to about 14% divinylbenzene by weight.

In another respect, disclosed herein are individual particles of substantially elastic particulate material that may be combined with hydraulic cement, and in which at least a portion of the individual particles of the substantially elastic material may include two components such as, for example, a core of substantially non-elastic material surrounded by a layer of substantially elastic material. In this regard, the core may include a material selected from at least one of silica, ceramics, synthetic organic particles, glass microspheres, or a mixture thereof; and the layer of substantially elastic material may include at least one of a cross-linked polymer, plastic, or a mixture thereof. Alternatively, the core may include a material selected from at least one of silica, ceramics, synthetic organic particles, glass microspheres, or a mixture thereof; the layer of substantially elastic material may include resin and make up greater than 8% by weight of the total weight of the particle. A substantially elastic particle may also be an agglomerate of substantially non-elastic material and substantially elastic material with the substantially elastic material making up between about 5% and about 50% by volume of the total volume of each of the individual particles of the material; and the substantially non-elastic material making up between about 50% and about 95% by volume of the total volume of each of the individual particles of the material. Alternatively, a substantially elastic particle may include at least one of a core component of a first material surrounded by at least one layer component of second material, or may include a first material impregnated with a second material, or may include a mixture thereof; wherein in any of these cases the first material of the particles may include at least one of ground or crushed nut shells, ground or crushed seed shells, ground or crushed fruit pits, processed wood, or a mixture thereof; and the second material may include a substantially elastic material as further described herein.

DESCRIPTION OF SPECIFIC EMBODIMENTS

Figure 1:
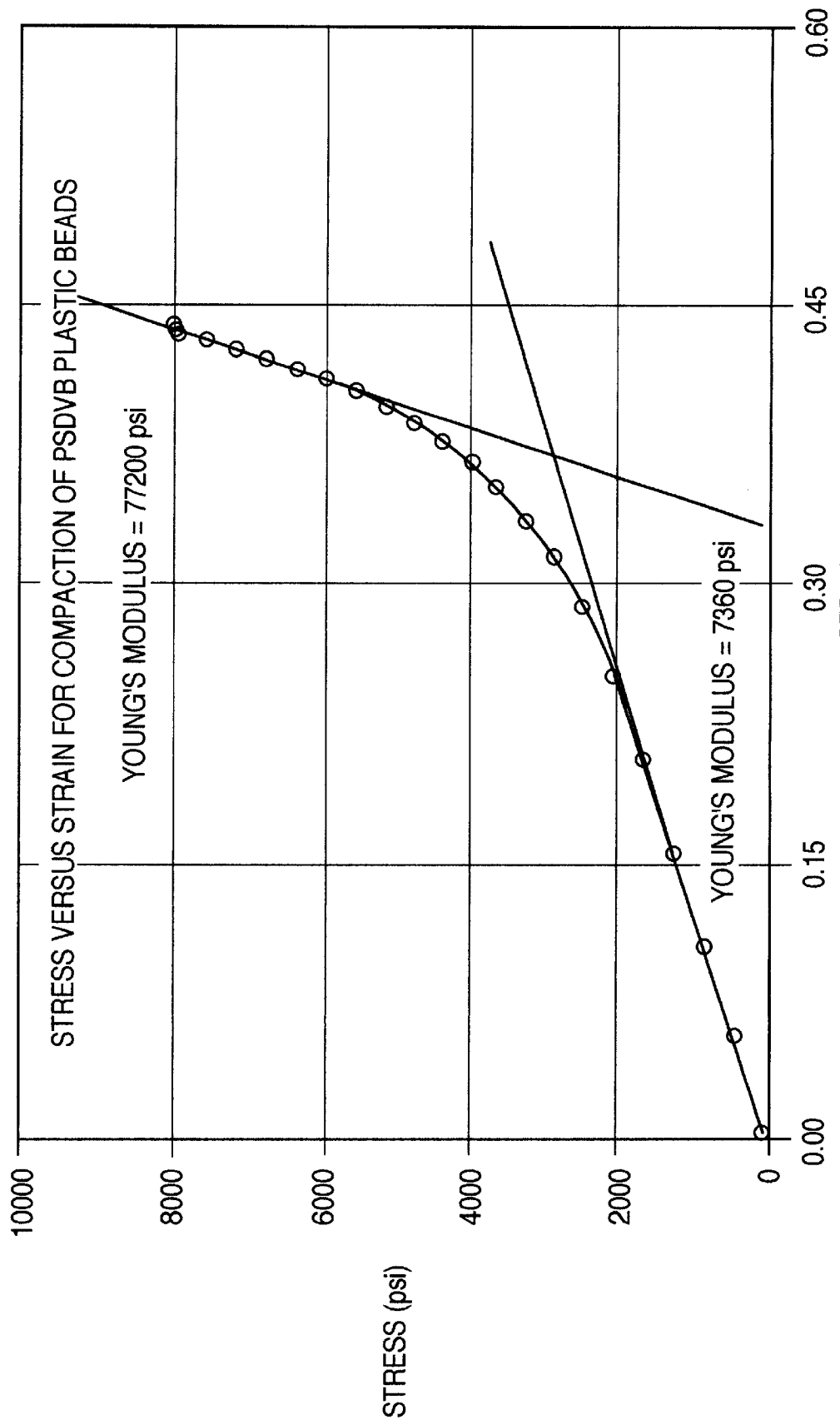
FIG. 1 illustrates the relationship between values of Young's modulus and stress for polystyrene divinylbenzene beads.

Disclosed are cement compositions, and methods of use thereof, which may include substantially elastic material that is capable of imparting resilient or elastic force so as to at least partially counteract volumetric shrinkage of a cement composition during curing. The disclosed cement compositions may be employed in a wide range of cementing applications, but in one embodiment may advantageously be used in those applications where cement is placed or allowed to cure in a substantially closed system. As used herein, "substantially closed system" means any environment in which access to water that is external to a cement composition is prevented or impaired during curing of the cement composition. Examples of such substantially closed systems include those cementing environments where access to free or external water during cement curing is blocked or impaired by impermeable or substantially impermeable materials such as rubber, metal, wood, rock, shale, etc. Specific examples of substantially closed systems include the interior of an inflatable or expandable packer, the annulus existing between two concentric strings of pipe or conduit, the interior of a mold used for producing preformed concrete items, etc. It will be understood with benefit of this disclosure, however, that benefits of the disclose cement compositions and methods may also be realized in applications that are not characterized as being "substantially closed systems."

In the practice of the disclosed methods and compositions, cement compositions including mixtures of hydraulic cement and particles of substantially elastic material may be employed. As used herein, "substantially elastic material" includes any material that is capable of at least partially recovering size and/or shape after deformation caused by exposure to an external force, such as pressure or compressional forces. In this regard suitable materials include those that are capable of fully or at least partially recovering original size and/or shape after removal of, or reduction in, the external force.

The disclosed cement compositions may be used to maintain volume or reduce shrinkage during cement curing without an external source of water, for example when used to inflate an inflatable packer. Surprisingly, these fluid compositions may be used to provide adequate compressive strength and predictable thickening times while at the same time minimizing or substantially eliminating problems typically associated with shrinkage during curing, such as those that may be encountered with attaining a hydraulic seal using inflatable packers and conventional cements. Thus, in one embodiment such compositions may be employed as expandable packer inflation fluids.

In the practice of the disclosed methods, particles of substantially elastic material may be combined with hydraulic cement or a mixture of hydraulic cements and an aqueous base fluid to form a cementing slurry. In this regard, any hydraulic cement or mixture of hydraulic cements suitable for cementing may be employed. With benefit of this disclosure, suitable cement type may be selected to fit a given cementing application using methods know in the cementing art. Examples of cementing applications include, but are not limited to, wellbore cementing, construction cementing, grouting, etc.

Examples of suitable hydraulic cement types that may be employed, alone or in mixtures, for wellbore cementing include Portland cements, and more particularly ASTM Type I, II, III, IV and/or V Portland cements, and API Class A, B, C, G and/or H Portland cements, pozzolan cements, portland cement blends, commercial lightweight cements, slag cements, microfine cements, etc. However, it will be understood with benefit of this disclosure that other cements and cements containing other additives may also be suitably employed, including those described elsewhere herein. In this regard, a suitable hydraulic cement type or mixture of hydraulic cement types and/or additives may be selected based on anticipated cementing conditions (e.g., downhole temperature, etc.) with the benefit of this disclosure using methods known in the art it will also be understood that particles of elastic material may be mixed or otherwise combined with a hydraulic cement, water, and/or other desired additives in any order suitable for forming a cement slurry. For example, a suitable hydraulic cement may be mixed with various admixtures including, but not limited to, pozzolan, blast furnace slag, hollow microspheres, nitrogen, gas generating additives, mixtures thereof, etc.

Other types of hydraulic cements that may be suitably employed in combination with substantially elastic material include magnesia cement compositions, such as those commercially available as "MAGNE-PLUS" and "MAGNE PLUS LT", both available from BJ SERVICES, Inc. In one embodiment, "MAGNE-PLUS" may be selected for use in well cementing applications having downhole temperatures of equal to or greater than about 140° F., and "MAGNE-PLUS LT" may be selected for use in well cementing applications having downhole temperatures of less than about 140° F., although either "MAGNE-PLUS" and "MAGNE PLUS LT" may be suitable for use in either temperature range. Other suitable types of hydraulic cement include slag cements, microfine cements, commercial lightweight cements, pozzolan cements, etc.

During cementing operations, a mixture of hydraulic cement and substantially elastic particulate material may be formulated and placed in a substantially closed system (such as the interior of an inflatable packer) so that it exhibits reduced shrinkage, substantially maintains volume or intrinsically expands during curing without an external source of water. As used herein, "external source of water" means any source of water other than the water used to mix or formulate a cement slurry prior to introducing the cement slurry downhole. In wellbore cementing, external water may be, for example, formation or connate water. In one embodiment, volumetric shrinkage of a hydraulic cement/substantially elastic particle mixture may be less than about 2%, alternatively less than about 1%, further alternatively less than about 0.5% in the absence of external water. Alternatively, such a mixture may maintain a substantially constant volume on curing in the absence of external water.

With benefit of this disclosure, it will be understood that volumetric shrinkage of cement compositions upon curing may be measured using methods known to those of skill in the art. Furthermore, methods of measuring volumetric shrinkage of cement compositions upon curing are illustrated in the Examples disclosed herein.

Substantially Elastic Materials

In the practice of the disclosed method, any natural or synthetic material that is substantially elastic, and more particularly that is selected to be substantially elastic under in situ cementing conditions (e.g., downhole well cementing conditions), may be employed. Such materials may be employed in particulate form, and may have individual particles of material may have shapes such as beaded, regular, or irregular shapes, or mixtures thereof. Examples of substantially elastic materials include, but are not limited to, those elastic materials having a Young's modulus of elasticity between about 500 psi and about 2,600,000 psi at anticipated cementing conditions, alternatively between about 500 psi and about 2,000,000 psi at anticipated cementing conditions, alternatively between about 5,000 psi and about 2,000,000 psi at anticipated cementing conditions, alternatively between about 5,000 psi and about 500,000 psi at anticipated cementing conditions, alternatively between about 5,000 psi and 200,000 psi at anticipated cementing conditions, and further alternatively between about 7,000 and 150,000 psi at anticipated cementing conditions. Other examples of substantially elastic materials include, but are not limited to, those elastic materials having a Young's modulus of elasticity between about 500 psi and about 30,000,000 psi at anticipated cementing conditions, alternatively between about 2,000,000 psi and about 30,000,000 psi at anticipated cementing conditions, alternatively between about 2,000,000 psi and about 10,000,000 psi at anticipated cementing conditions, alternatively between about 5,000 psi and about 5,000,000 psi at anticipated cementing conditions, and alternatively between about 7,000 psi and about 1,500,000 psi at anticipated cementing conditions. Yet other examples of substantially elastic materials include, but are not limited to, those elastic materials having a Young's modulus of elasticity between about 500 psi and about 150,000 psi at anticipated cementing conditions. Substantially elastic materials may also have values of Young's modulus of elasticity that are greater than or lesser than those values given in the ranges above.

Although not necessary to realize the benefit of the disclosed method, substantially elastic materials may be selected based on pressure or compressional forces anticipated to be encountered by a cementing composition (e.g., a cement slurry) following placement of a hydraulic cement/substantially elastic particulate blend into a selected location (e.g., a substantially closed system). In this regard, type or types of substantially elastic particulate materials may be selected to be capable of being at least partially compressed or deformed at the anticipated conditions of temperature and pressure or compressional forces present at the selected location prior to and during cement composition curing, and to be capable of at least partially elastically rebounding and expanding in volume upon anticipated reduction in the pressure/compressional forces upon curing of the cement composition at the selected location. In subterranean wellbore applications (e.g., within the interior of an inflatable packer, in the annular space between two strings of casing, etc.), pressure/compressional forces before and during cement composition curing will result from the combined hydrostatic pressure of the wellbore fluids (e.g., cement slurry, drilling mud, weighted brine, etc.) at the depth of the selected location, in combination with any additional wellhead pressure that may be present. Upon curing of the cement composition, these compressional forces are typically substantially reduced due to hardening of the cement. With benefit of this disclosure, it will be understood that anticipated cementing conditions (as well as conditions of temperature) before, during and after curing of a cement composition, may be estimated using methods known to those of skill in the art. Evaluation of the effectiveness of substantially elastic particulate materials at these anticipated conditions for use in the methods disclosed herein may be made, for example, using those techniques described elsewhere herein. Furthermore, values of Young's modulus of elasticity may be additionally or alternatively used as a guide in selection of materials that will behave in a substantially elastic manner under given cementing conditions (e.g., temperature, pressure, etc.). For example, in some circumstances it may be desirable to use materials with relatively lower values of Young's modulus where relatively lower pressures before and during cement curing are anticipated.

In the disclosed method, it may be desirable to select substantially elastic materials having a glass transition temperature that is greater than the anticipated cementing temperature. Examples of suitable elastic materials include, but are not limited to, polymers, cross-linked polymers, suitably elastic plastics, etc. In this regard, with benefit of this disclosure elastic materials having varying or increased glass transition temperatures may be selected by those of skill in the art. For example, polystyrene beads with greater amounts of divinyl benzene crosslinker tend to have increased hardness and glass transition temperature.

Depending on cementing conditions, materials that may be suitable in the practice of the disclosed method may include, but are not limited to, cellulose acetate butyral, polystyrene acrylonitride, polytetrafluoroethylene, diglycol alkyl carbonates, epoxy resins, polyester, furan, phenol formaldehyde, phenolic epoxy, urea aldehydes, silicones, acrylics, vinyl acetates, casein, and natural and synthetic rubbers. For example, at cementing temperatures of from about 50° F. to about 300° F., crosslinker elastomeric or polymeric materials may be employed, although cementing temperatures outside this range are also possible.

Polymers that may be crosslinked for use in the disclosed method may include, but are not limited to, polystyrene, methylmethacrylate, nylon, polycarbonates, polyethylene, polypropylene, polyvinylchloride, polyacrylonitrile-butadiene-styrene, polyurethane, or any other suitable polymer, and mixtures thereof. For example, suitable crosslinkers may include divinylbenzene. Particularly suitable materials may include elastic particles manufactured of resin and/or those commercially available materials that do not substantially interact chemically with components of well treatment fluids and which are stable in a subterranean cementing environment.

In the practice of the disclosed method, elastic materials of crosslinked polymers may contain varying percentages of crosslinker to produce materials having varying degree of elasticity. In this regard, any amount of crosslinker suitable for forming elastic material may be employed. Percentages of crosslinker employed may be selected on many factors if so desired, such as the intended use of the elastic material, the specific crosslinking agent, and other constituents which may optionally be present in the elastic material. For example, changing the percentage of divinylbenzene crosslinker present in polystyrene divinylbenzene beads from about 14% to about 4% to about 0.5% to about 0.3% changes the confined Young's modulus at standard conditions from about 100,000 psi to about 70,000 psi to about 50,000 psi to about 30,000 psi, respectively. Examples of in situ elastic modulus value ranges for polystyrene divinylbenzene materials having varying amounts of divinyl benzene crosslinker are from about 500 to about 2,000,000 psi for amounts of crosslinker of from about 0.5% to about 10% by weight, and from about 2,000,000 to about 30,000,000 for amounts of crosslinker of from about 10% to about 20% by weight.

In one embodiment of the disclosed method, polystyrene divinylbenzene material (e.g., plastic beads, etc.) having between about 0.3% and about 55%, and alternatively between about 0.5% and about 20% by weight of divinylbenzene crosslinker, may be employed. For example, in one exemplary embodiment of the disclosed method which may be employed for wellbore cementing at static bottom hole (or cementing) temperatures of up to and including about 200° F., polystyrene divinylbenzene plastic material having from about 0.1% to about 14%, alternatively from about 0.5% to about 14% by weight of divinylbenzene crosslinker may be employed. In this regard, divinylbenzene concentrations of polystyrene material employed in this embodiment may be selected and/or varied to meet particular cementing applications by those of skill in the art with benefit of this disclosure.

In addition to divinyl benzene materials having the crosslinker ranges given above, materials having other ranges of crosslinker may also be employed, including, but not limited to, polystyrene divinyl benzene material containing less than or equal to about 14%, and alternatively greater than or equal to about 0.5% by weight of divinylbenzene crosslinker. It will be understood with benefit of this disclosure that the preceding concentration ranges for use at temperatures of up to about 200° F. are exemplary only, and that polystyrene divinylbenzene materials containing greater than about 14% and less than about 0.1% by weight polystyrene divinylbenzene may also be employed at cementing temperatures within this range.

For example, in another embodiment of the disclosed method which may be employed at cementing temperatures of greater than about 200° F., and alternatively from greater than about 200° F. to about 300° F., polystyrene divinylbenzene plastic material (e.g., beads, etc.) having greater than about 14% by weight divinyl benzene crosslinker may be employed. In this regard, divinylbenzene concentrations of polystyrene material employed in this embodiment may be selected and/or varied to meet particular cementing applications by those of skill in the art with benefit of this disclosure. For example, polystyrene divinyl benzene plastic material containing from greater than about 14% to about 55%, and alternatively from greater than about 14% to about 20% by weight of divinylbenzene crosslinker may be employed in this temperature range. The preceding concentration ranges for use at cementing temperatures of greater than about 200° F. are exemplary only, and that polystyrene divinylbenzene beads containing less than or equal to about 14% by weight polystyrene divinylbenzene may also be employed at cementing temperatures within this range. It will also be understood that the polystyrene divinylbenzene materials disclosed herein may be employed at temperatures of greater than about 300° F., if so desired.

Polystyrene divinylbenzene plastic material having the above-described concentration ranges of divinylbenzene crosslinker may be employed under a wide variety of cementing conditions. For example, it may be preferable to use beads containing less divinylbenzene crosslinker for applications where a curing cement may be exposed to relatively lower cementing pressures, and/or relatively lower temperatures. Thus, in one exemplary embodiment, polystyrene divinylbenzene plastic material having from about 0.3% to about 0.5% by weight divinylbenzene crosslinker may optionally be employed in cementing applications in which curing cement is expected to be exposed to pressures or compressional forces of less than or equal to about 6000 psi. In another exemplary embodiment, polystyrene divinylbenzene plastic material having greater than or equal to about 4% by weight divinylbenzene crosslinker may be employed in cementing applications in which curing cement is expected to be exposed to pressures or compressional forces of greater than about 6000 psi. However, these are exemplary embodiments given herein only to illustrate possible applications of the disclosed method and therefore do not limit the use of polystyrene divinylbenzene materials having these or other specific concentration ranges of divinylbenzene crosslinker at other cementing pressures or compressional forces.

Variations of other substantially elastic materials may also be employed in the practice of the disclosed method. For example, the polymer type and/or composition of a substantially elastic material may be varied in order to further tailor the characteristics of elastic particles to anticipated cementing conditions and/or to optimize cost versus benefits of the disclosed method, if so desired. In this regard, elastic particles may be formulated to comprise co-polymers for use at higher cementing temperatures, such as temperatures greater than about 300° F. For example, terpolymer compositions (such as those comprising polystyrene/vinyldivinyl benzene, acrylate-based terpolymer, other terpolymers, etc.) may be employed.

For illustration purposes, Table I includes a partial listing of melting point, glass transition temperature and Young's modulus of elasticity values for some of the polymer materials listed above. In one embodiment of the practice of the disclosed method, polystyrene divinylbenzene particles may be employed at cementing temperatures from about 150° F. to about 300° F., and at curing pressures of from about 500 psi to about 20,000 psi. For lower cementing temperatures, such as below about 150° F., materials such as rubbers or non-crosslinked polymers, including non-crosslinked species of those polymers described above, may be desirable. At higher cementing temperatures, such as above about 300° F., materials such as polyvinylchloride, polystyrene or melamine formaldehyde, may be desirable.

TABLE 1

| Polymer | Melting Point, °C. | Glass Transition Temp. °C. | Modulus of Elasticity, psi | |
|---|---|---|---|---|
| | | | Lower Range | Upper Range |
| Polyacrylonitrile-butadiene-styrene | | 90–120 | — | |
| Melamine-formaldehyde | | | 1,300,000 | 1,950,000 |
| Polystyrene | 240 | 85–105 | 400,000 | 600,000 |
| Methylmethacrylate | 100 | | 350,000 | 500,000 |
| Polycarbonate | | 105 | 290,000 | 325,000 |
| Polyvinylchloride | 285 | 75–105 | 200,000 | 600,000 |
| high density polyethylene | 135 | | 85,000 | 160,000 |
| low density polyethylene | 115 | | 35,000 | 90,000 |

TABLE 1-continued

| Polymer | Melting Point, ° C. | Glass Transition Temp. ° C. | Modulus of Elasticity, psi | |
|---|---|---|---|---|
| | | | Lower Range | Upper Range |
| Polystyrene divinylbenzene | | | 7,000 | 150,000 |
| Polypropylene | 168 | 25 | 1,400 | 1,700 |
| Polyurethane | | 90–105 | | |

For any given material, values of Young's modulus may vary with in situ cementing conditions, such as temperature and pressure (or stress). As an example, FIG. 1 illustrates the relationship between values of Young's modulus and stress for polystyrene divinylbenzene beads. Further information on materials from which substantially elastic material may be selected with benefit of this disclosure may be found in U.S. Pat. No. 6,059,034; U.S. patent application Ser. No. 09/519,238 filed Mar. 6, 2000; U.S. patent application Ser. No. 09/579,146 filed May 25, 2000; and in U.S. patent application Ser. No. 09/579,147 filed May 25, 2000; each of the foregoing references being incorporated herein by reference.

As previously mentioned, substantially elastic material may be incorporated in the form of particulates into a cement composition. In this regard, sizes and shapes of individual particles of substantially elastic material may be any size and/or shape suitable for mixture with a hydraulic cement, formation of a slurry with the mixture, and placement of the slurry in a desired manner. For example, in an inflatable packer cementing embodiment, it is believed that a desirable size range of substantially elastic particulate material may be chosen relative to the narrowest clearance found in the inflatable packer or the inflation tool. Thus, in the case of an inflatable packer, a desirable range of particle sizes is one that allows the slurry containing the substantially elastic material to pass through an inflation tool into an inflatable packer without causing an obstruction. However, it will be understood with benefit of this disclosure that this is just an optional Guideline, and that sizes outside such a size range may be of benefit as well.

Further, individual particles of substantially elastic particulate material may be configured to have any shape and size suitable for deforming in response to pressure or other compressional forces exerted on the particles during placement and/or during curing of a cement composition containing these particles, and that is capable of at least partially rebounding or at least partially recovering original shape/size with a reduction in these pressures or compressional forces as the cement composition cures or sets. Examples of suitable shapes include spherical beaded shapes, non-spherical beaded shapes, and non-beaded shapes. Examples of non-spherical beaded-shaped particles include, but are not limited to, beaded particles having a shape that is elongated in one or more dimensions, such as particles that are oval shaped, egg-shaped, tear drop shaped, or mixtures thereof. Examples of non-beaded particles include, but are not limited to, particles having a shape that is cubic, bar-shaped (as in a hexahedron with a length greater than its width, and a width greater than its thickness), rod-shaped, cylindrical, multi-faceted, irregular, tapered (e.g., tapered diameter) or mixtures thereof. Beaded or non-beaded substantially elastic particles may also have a surface that is substantially roughened or irregular in nature or a surface that is substantially smooth in nature. Moreover, it will also be understood that mixtures or blends of substantially elastic particles having different shapes and/or sizes may be employed in the disclosed cement compositions. Further detailed information on shapes and sizes of individual particles, from which suitable sizes and shapes of substantially elastic material particles may be selected with benefit of this disclosure, may be found in U.S. Pat. No. 6,059,034; U.S. patent application Ser. No. 09/519,238 filed Mar. 6, 2000; U.S. patent application Ser. No. 09/579,146 filed May 25, 2000; and in U.S. patent application Ser. No. 09/579,147 filed May 25, 2000; each of the foregoing references being incorporated herein by reference.

In one embodiment of the disclosed method and compositions, elastic material or particles that are as fine or small as practical may be desirable. For example, in a specific exemplary embodiment, substantially elastic particles used in the disclosed method may have a beaded shape, and a size of from about 4 mesh (about 4.7 mm) to about 500 mesh (about 0.029 mm), alternatively from about 30 mesh (about 0.58 mm) to about 200 mesh (about 0.074 mm), alternatively from about 50 mesh (about 0.297 mm) to about 100 mesh (about 0.149 mm), further alternatively from about 60 mesh (about 0.25) to about 80 mesh (about 0.177 mm). However, sizes greater than about 4 mesh and less than about 500 mesh are possible as well.

Substantially elastic material having any density suitable for use in a particular cementing application may be employed in the practice of the disclosed method. However, in one embodiment, the specific gravity of a substantially elastic particulate material may be from about 0.3 to about 12, alternatively from about 0.3 to about 3.5, alternatively from about 1.0 to about to 1.8, and further alternatively from about 1.0 to about 1.1. In another specific embodiment, a particular divinylbenzene crosslinked polystyrene particle may have a bulk density of from about 0.4 to about 0.65, and alternatively of about 0.6. In another specific exemplary embodiment, a particular divinylbenzene crosslinked polystyrene particle may have a specific gravity of about 1.055. However, other specific gravities are possible.

Substantially elastic particles may be mixed and pumped with hydraulic cement throughout all, or during any selected portion or portions of a cementing treatment. It is also possible that mixtures of substantially elastic particles and hydraulic cement may be pumped in two or more multiple stages throughout a cementing operation.

In the practice of the disclosed method, any suitable concentration of substantially elastic particles may be mixed with hydraulic cement, with greater concentrations of substantially elastic particles typically resulting in less shrinkage of the hydraulic cement/substantially elastic particle mixture. However, in one embodiment, the amount of substantially elastic material in a cementing composition may be from about 1% to about 100% of substantially elastic material by weight of cement ("BWOC"), alternatively from about 5% to about 50% of substantially elastic material BWOC, alternatively from about 10% to about 40% of substantially elastic material BWOC, alternatively from about 10% to about 30% of substantially elastic material BWOC, alternatively from about 20% to about 30% of substantially elastic material BWOC, alternatively from about 10% to about 20% of substantially elastic material BWOC, further alternatively about 20% substantially elastic material BWOC. For example, a cement composition containing 100% substantially elastic particles BWOC (or a ratio of 1:1 by weight of substantially elastic particles and hydraulic cement) would equal to 94 pounds of substantially elastic particles blended with 94 pounds of hydraulic cement, in other words a 1:1 weight ratio between the substantially elastic particles and hydraulic cement. It will be understood with benefit of this disclosure that the ranges of percentage of substantially elastic material in a dry cementing composition given above are exemplary only, and that greater and lesser values are also possible.

In the practice of the disclosed method, substantially elastic material may be blended or mixed with a hydraulic cement or mixture of hydraulic cements in any manner suitable for intermixing the components prior to, or during a cementing operation. For example, substantially elastic material may be mixed off-site or on-site with a hydraulic cement to form a dry mix cement composition prior to mixing with an aqueous mixing fluid. In one embodiment, the composition may be formulated off-site and stored off-site for future use, and then transported to a job site (such as a well location) when ready for use. Substantially elastic materials may also be mixed or blended into a cement composition as it is being formulated at a job or wellsite. For example, substantially elastic material may be added as dry material (or alternatively as material contained in an aqueous fluid-based slurry) to a dry hydraulic cement prior to mixing with an aqueous fluid, or combined with an already-mixed hydraulic cement/aqueous fluid cement composition. With benefit of this disclosure, those of skill in the art will understand that cement mixing and/or transportation methods known in the art may be employed to. formulate and/or transport dry or liquid cement compositions containing substantially elastic material and hydraulic cement. For example, when used as part of a wellbore cementing operation, substantially elastic material may be blended with hydraulic cement to form a cement slurry in a manner outlined above and introduced or pumped into a wellbore, for example using a rig pump, cementing unit, or any other suitable device.

In one embodiment, substantially elastic particulate material may be polystyrene divinylbenzene plastic beads. With benefit of this disclosure, polystyrene divinylbenzene plastic beads suitable for use with the disclosed methods and compositions may be prepared using techniques that would be apparent to those of skill in the art or purchased, for example, from suppliers such as ATS Incorporated, Dow Chemical, Sun Drilling Products, etc. In one exemplary embodiment, cross-linked polystyrene beads having a specific gravity of from about 1.0 to about 1.8 may be employed. As a specific example of the use of this type of substantially elastic particulate material, 60–80 mesh polystyrene divinylbenzene copolymer plastic beads having a specific gravity of about 1.0 may be mixed with hydraulic cement at a weight ratio of about 30% BWOC. These particular polystyrene divinylbenzene copolymer plastic beads are commercially available, for example, as a lubrication or torque reduction aid for drilling fluids from ATS Incorporated under the brand name "AT SLIDE (FINE)," or from Sun Drilling Products under the brand name "LUBRAGLIDE," or as ion exchange beads manufactured by Dow Chemical. These beads offer crush resistance, are resistant to solvents, and are substantially round and smooth, having length to width and length to height ratios of about 1:1. Test results indicate that these plastic beads are elastic under conditions of stress. Test results also show that these beads are compatible with oil field solvents and acids. Favorable cementing treating characteristics offered by polystyrene divinylbenzene beads include, among other things, strength, crush resistance, chemical resistance, elasticity, and high glass transition temperature.

Multi-Component Particles Including Substantially Elastic Material

In alternative embodiments of the disclosed method, multi-component or multiple component substantially elastic particle may be utilized. As used herein "multi-component" or "multiple component" means a particle comprised of at least two materials having different elastic or deformation characteristics (such as differing values of elastic modulus). Such a particle may have a structural matrix that is substantially uniform in physical composition and may contain substantially no micro structure, and/or be substantially non-porous in nature. Such may be the case, for example, where two substantially uniform, non-porous, components are combined to form a particle having a substantially continuous and substantially uniform physical structure. In alternate embodiments, it may be possible to employ multi-component particles having micro structures, such as agglomerates.

In one embodiment, at least one component of a multi-component particle may have the characteristic of being substantially elastic, and at least one other component of the particle may have the characteristic of being substantially non-elastic and/or substantially non-deformable relative to the elastic component. Alternatively, at least two components of such a particle may be substantially elastic, having similar or differing elastic characteristics The two or more materials may be configured in virtually any manner desired to form multi-component particles, for example, to achieve varying overall elastic and/or deformation characteristics of such particles. Possible particle configurations include, but are not limited to, layered particles (such as concentrically layered particles), agglomerated particles, stratified particles, etc. Such multi-component substantially elastic particles may be employed in combination with hydraulic cement in any of the amounts described elsewhere herein for substantially elastic particles. Furthermore, mixtures of such multi-component particles with single component particles, or particles comprising substantially 100% elastic material are also possible in combination with hydraulic cement.

In one embodiment, two or more materials may be configured in virtually any manner desired to form multi-component particles (for example, as described elsewhere herein) to achieve varying overall density and/or elasticity characteristics (e.g., in situ Young's modulus) of such particles, for example, to meet specific cementing conditions. For example, a first core material of desired elasticity/density characteristics may be coated or at least partially surrounded with at least one layer of a second material of desired elasticity/density characteristics that may be selected to act to vary the elasticity of the particle and/or to isolate or protect the first material from adverse cementing conditions, such as to avoid saturation with liquids. In this regard, any coating material known in the art and suitable for imparting desired degree of elasticity and/or density, and/or that is suitable for at least partially protecting or isolating the first core material may be employed. Examples of such core and/or layer materials include, but are not limited to resins (e.g., urethane, phenolic, melamine formaldehyde, etc.). With benefit of this disclosure, suitable coating materials may be selected by those of skill in the art to achieve or impart the desired qualities to a first core material, considering anticipated cementing conditions or requirements of elasticity and/or density.

Methods for manufacturing particulates with multiple components using, for example, materials such as resin/s are known in the art, and such materials are available, for example, from manufacturers listed herein. In this regard, coating operations may be performed using any suitable methods known in the art. For example, low temperature curing methods may be employed if desired (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure.

Examples of resins that may be employed as substantially elastic material layers for protective and/or elasticity-modifying purposes include, but are not limited to, phenol formaldehyde resins, melamine formaldehyde resins, and urethane resins, low volatile urethane resins (e.g., these and other types of resins available from BORDEN CHEMICAL INC., SANTROL, HEPWORTH of England), etc., and mixtures thereof. Specific examples of suitable resins include, but are not limited to, resins from BORDEN CHEMICAL and identified as 500-series and 700-series resins (e.g., 569C, 794C, etc.). Further specific examples of resins include, but are not limited to, "SIGIASET" series low temperature curing urethane resins from BORDEN CHEMICAL (e.g., "SIGMASET", "SIGMASET LV", "SIGMASET XL"), "ALPHASET" phenolic resin from BORDEN, "OPTI-PROP" phenolic resin from SANTROL, and "POLAR PROP" low temperature curing resin from SANTROL. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials. For example, in one embodiment, (e.g., ground walnut shells or other core material) may be coated with SANTROL "OPTI-PROP" resin in a single coating step using indirect heat (e.g., at temperatures of up to about 300° F., or alternatively from about 150° F. to about 200° F.). Where desired, curing characteristics (e.g., curing time, etc.) may be adjusted to fit particular layer application methods and/or final product specifications by, for example, adjusting relative amounts of resin components. Still further examples of suitable resins and coating methods include, but are not limited to, those found in European Patent Application EP 0 771 935 A1; and in U.S. Pat. Nos. 4,869,960; 4,664,819; 4,518,039; 3,929,191; 3,659,651; and 5,422,183, each of the foregoing references being incorporated herein by reference in its entirety.

In one exemplary embodiment, substantially elastic particulate materials (e.g., relatively lightweight substantially elastic particles, etc.) may be optionally coated with substantially elastic protective materials such as resins and/or hardeners, for example, "2AC" phenol formaldehyde hardener from BORDEN CHEMICAL. Examples of relatively lightweight and/or substantially neutrally buoyant materials include, but are not limited to, ground or crushed shells of nuts such as walnut, pecan, almond, ivory nut, brazil nut, etc.; ground or crushed seed shells (including fruit pits) of seeds of fruits such as plum, peach, cherry, apricot, etc., ground or crushed seed shells of other plants such as maize (e.g., corn cobs or corn kernels), etc. processed wood materials such as those derived from woods such as oak, hickory, walnut, poplar, mahogany, etc. including such woods that have been processed by grinding, chipping, or other form of particalization. In one embodiment, such particles may be employed with relatively lightweight cements, such as foamed cements containing an energizing phase like nitrogen, and/or cements containing low density additives such as those described elsewhere herein.

Optional protective coatings for coating at least a portion of individual particles of such relatively lightweight and/or substantially neutrally buoyant materials include, but are not limited to at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. It will be understood by those of skill in the art that such protective and/or hardening coatings may be used in any combination suitable for imparting desired characteristics to a relatively lightweight and/or substantially neutrally buoyant particulate material, including in two or more multiple layers. In this regard successive layers of protective coatings, successive layers of hardening coatings, alternating layers of hardening and protective coatings, etc. are possible. Mixtures of protective and hardening coating materials may also be possible.

In one embodiment, specific gravity of such materials may range from about 0.4 to about 4, alternatively from about 0.8 to about 4. In another embodiment, specific gravity of such materials may range from about 0.4 to about 1.5, alternatively from about 0.5 to about 1.5. In another embodiment, specific gravity of such materials may range from about 0.5 to about 2, alternatively from about 0.5 to about 1.5, alternatively from about 1 to about 1.5, alternatively about 1.2. It will be understood that the foregoing embodiments are exemplary only and greater or lesser values are also possible. With benefit of this disclosure, those of skill in the art will understand that selection of suitable specific gravity of such a particulate will depend, in part, on the specific gravity of a cement slurry and on whether it is desired that the selected particle be relatively lightweight and/or substantially neutrally buoyant in the selected cement slurry.

It will be understood with benefit of this disclosure that suitable relatively lightweight and/or substantially neutrally-buoyant materials may be chipped, ground, crushed, or otherwise processed to produce particulate material having any particle size or particle shape suitable for use in the methods disclosed herein. In one exemplary embodiment, particle sizes include, but are not limited to, sizes ranging from about 4 mesh to about 100 mesh, alternatively from about 12 mesh to about 50 mesh. In another exemplary embodiment, particle sizes include, but are not limited to, sizes ranging from about 8 mesh to about 40 mesh, alternatively from about 14 mesh to about 40 mesh. Shapes of such particles may vary, but in one embodiment may be utilized in shapes having maximum length-based aspect ratio values as described elsewhere herein for particles, and in one embodiment may have a maximum length-based aspect ratio of less than or equal to about 5. Once again, the preceding ranges of values are exemplary only, and values outside these ranges are also possible.

Specific examples of suitable materials suitable for the relatively lightweight and/or substantially neutrally buoyant material embodiments described above include, but are not limited to ground or crushed nut shells available from suppliers such as "COMPOSITION MATERIALS, INC." of Milford, Conn.; "AGRASHELL, INC." of Bath, Pa.; "BAROID", and/or "CALIFORNIA NUT ASSOCIATION". These products include "walnut shell grit" available from "COMPOSITION MATERIALS, INC.", "AD-3" ground walnut hulls from "AGRASHELL" (having a particle size of about 12/20 mesh, a specific gravity of about 1.2, and a maximum length-based aspect ratio of about 5), as well as "AD-6B" ground walnut shells (having a particle size of about 20/40 mesh, a specific gravity of about 1.2, and a maximum length-based aspect ratio of about 5). Such ground walnut hull material is available, for example, for use as a blasting media. In one exemplary embodiment, ground walnut hulls having a particle to size of about 12/20 mesh and a maximum length-based aspect ratio of about 5 may be employed as a particulate. Such materials may be coated for use in these applications as described elsewhere herein.

In another exemplary embodiment, ground walnut hulls (or another porous or permeable first material) may be partially or completely impregnated with a second material, by for example, vacuum and/or pressure impregnation, spraying with hardener, or a combination thereof. For example, material may be immersed in a second material and then exposed to pressure and/or vacuum to impregnate the material. Such methods are known in the art for impregnating porous materials, such as impregnating core samples with fluids, etc. Alternatively, application of a second material may result in at least partial impregnation, for example, it has been found that up to about 10% to about 12% by weight of total particle weight of resin (such as BORDEN "SIGMASET XL") may be applied and penetrate into the porosity of ground walnut shells. Furthermore, it will be understood that a first relatively lightweight and/or substantially buoyant material may be combined with more than one other material, e.g., using the methods and configurations described elsewhere herein for embodiments involving first and second materials. Advantageously, substantially elastic material properties may be imparted or increased for a given first material by coating and/or impregnation with one or more substantially elastic second materials (e.g., resins, polymers, plastics, etc.). Furthermore, the substantially elastic characteristics of a first material may be adjusted to fit particular cementing conditions by coating or impregnation with one or more second materials.

A coating of one or more second materials may be from about 0.1% by weight to about 50%, alternatively from about 1% by weight to about 20% by weight, alternatively from about 10% by weight to about 20%, alternatively from about 2% to about 12% by weight of the total weight of the multi-component particle, although greater and lesser amounts are possible. In this way, a first material such as ground walnut shell particulates may be coated with, for example, from about 2% to about 12% of a suitable resin (e.g., BORDEN "SIGMASET LV" resin) by weight of total weight of each particle to form relatively lightweight and/or substantially neutrally buoyant particulate. Such particles may exhibit increased strength and/or resistance to well fluids and cementing conditions over uncoated ground walnut hulls. In one embodiment, it has been found that application of from about 8% to about 12% by weight of total particle weight of "SIGMASET LV" resin to ground walnut hull particulate material serves to permeate the material so as to substantially fill the accessible or permeable porosity of the materials such that a relatively shiny or glazed surface appearance is achieved.

In one specific example, a ground or crushed walnut shell material may be coated with a resin, for example, to substantially protect and water proof the shell. Such a material may have a specific gravity of from about 1.25 to about 1.35, and a bulk density of about 0.67. In one exemplary case, size of such a material may be about 12/20 US mesh size. In another exemplary case, sizes may range from about 4 mesh to about 100 mesh. In one embodiment for the manufacture of such particles, an optional hardener may be applied to a ground walnut shell material first followed by a urethane coating as described elsewhere herein that may vary in amount as desired. For example, such a coating material may be present in an amount of from about 1% to about 20%, alternatively from about 10% to about 20% by weight of total weight of individual particles. Alternatively, such a coating material may be present in an amount of from about 2% to about 12% by weight of total weight of individual particles. Amount of resin may depend, for example, on price and application. In this regard, particulates may be first sprayed or otherwise coated with a hardener, and a coating may be applied to be about 12% by weight of total weight of the particle.

In one exemplary embodiment, about 12/20 mesh ground walnut hulls from "COMPOSITION MATERIALS, INC." having an in situ Young's modulus of from about 1,000,000 psi to about 2,000,000 psi (and described elsewhere herein) may be coated with a second material, such as "SIGMASET LV" or "SIGMASET XL" resin available from BORDEN CHEMICAL (in amounts as described elsewhere herein). Such coated particles may be manufactured and/or supplied, for example, by BORDEN CHEMICAL. It will be understood that a protective resin layer may also function as a hardener to the core material, however, an additional and separate hardener material layer may also be present to impart additional hardness to the core material if so desired. In one exemplary embodiment in which such a separate hardener layer is present, ground walnut shell particulates may be first coated with from about 2% to about 10% by weight (and alternatively about 2% by weight) of total weight of a separate hardener material (e.g., BORDEN "2AC" hardener) and then coated with from about 1% to about 20% by weight (and alternatively about 4% by weight) of another resin (e.g., BORDEN "SIGMASET XL" or "SIGMASET LV" resin). In one exemplary embodiment then, the 12/20 mesh ground walnut shells described above may be coated with about 2% by weight of total weight of BORDEN "2AC" hardener and about 4% by weight of total weight of BORDEN "SIGMASET XL." This embodiment includes particles available from BJ SERVICES and having the tradename "FLEXSAND™" or "FLEXSAND™ LS" at the time of filing of this application. In an alternate exemplary embodiment, such particles may be 12/20 mesh ground walnut shells (as described above) and coated with from about 8% to about 10% by weight of total weight of BORDEN "SIGMASET XL," without a separate hardener. In a further alternative exemplary embodiment, such particles may be 12/20 mesh ground walnut shells (as described above) and coated with from about 6% to about 12% by weight of total weight, alternatively from about 8% to about 12% by weight of total weight, alternatively from about 8% to about 10% by weight of total weight, and further alternatively about 6% by weight of total weight SANTROL "OPTI-PROP," without a separate hardener.

It will be understood that amounts of coating/impregnating materials described herein are exemplary only, and may be greater or lesser. Furthermore, particular coatings and/or impregnation materials may be selected based on elastic and/or protective qualities desired for the anticipated conditions of a particular cementing application. For example, protective qualities of particular coatings and/or impregnation materials may be evaluated by exposure to anticipated well fluids, (e.g., acids, etc.), temperatures, pressures, etc. to optimize particular particles for particular applications. In addition, it will be understood with benefit of this disclosure that other types, shapes and/or sizes of substantially elastic particulate materials, coating/impregnator types, coating/impregnator amounts, number of coatings, etc. may be employed. In this regard, it will be understood with benefit of this disclosure that any desired combination of one or more second material coatings and/or impregnation materials with any of to the first or core materials disclosed herein (i.e., including materials other than the above-described relatively lightweight or substantially neutrally buoyant materials) is also possible.

In another exemplary embodiment, an agglomerated multi-component particle may comprise an agglomerated mixture of silica and resin, or alternatively a mixture of resin and feldspar or other particulate matter, for example, as described elsewhere herein. In other embodiments, particulates such as feldspar, processed nut dust (e.g., walnut hull dust or dust of similar materials), or other suitable particulate material may be similarly encapsulated in resin. Particulates for encapsulation may be any size suitable for encapsulation, and in one embodiment are less than about 100 microns, alternatively from about 6 microns to about 100 microns, alternatively less than about 10 microns, alternatively from about 6 microns to less than about 10 microns, and further alternatively about 6 microns. In such embodiments, a resin component may comprise any resin suitable for encapsulating the silica, including, but not limited to, any of the other resin materials described elsewhere herein for use in other embodiments of the disclosed methods and include, but are not limited to, epoxy resins, furan, phenol formaldehyde, melamine formaldehyde, urethane, phenolic epoxy, etc., including any of the other resins described elsewhere herein for use in other embodiments. One such example is a particle comprising from about 10% by weight to about 20% by weight, alternatively about 10.5% by weight, further alternatively about 20% by weight, of phenolic resin mixed with particles of silica having a size of from about 6 to about 100 microns, alternatively with particles of silica having a size of less than about 10 microns, alternatively with particles of silica having a size from about 6 microns to less than about 10 microns, and further alternatively with particles of silica having a size of about 6 microns. Such particles are manufactured and/or supplied, for example, by "BORDEN CHEMICAL.

In another exemplary embodiment, a particle may comprise an agglomerate particle core (e.g., having a composition of an agglomerate particle described elsewhere herein) that is coated with a separate substantially elastic material. Such particles may be substantially spherical or beaded in shape and, for example, may comprise a core of about 10% by weight to about 20% by weight, alternatively about 12% by weight of BORDEN 700-series or 500-series phenolic resin by total weight of the particle mixed with sub-particles of feldspar ("MINEX 4" available from "UNIMIN") having a size of from about 6 to about 100 microns, alternatively with particles of feldspar or "MINEX" having a size of less than about 10 microns, alternatively with particles of feldspar or "MINEX" having a size of from about 6 microns to less than about 10 microns and alternatively with particles of feldspar or "MINEX" having a size of about 6 microns. Such an agglomerate particle may be surrounded by a coating of, for example from about 5% to about 20% by weight, alternatively from about 5% to about 10% by weight, further alternatively of about 8% by weight of total weight of the particle of a urethane resin such as "SIGMASET LV". Such particles are manufactured and/or supplied, for example, by "BORDEN CHEMICAL." In other embodiments, agglomerate particles of similar structure but having other substantially non-deformable and/or substantially non-elastic components (such as silica, ground nut dust, metal particles, etc.) are also possible. Furthermore a core and outside layer of such a material may comprise the same resin (e.g., both being "SIGMASET LV", BORDEN "794" resin, BORDEN "569C" resin or any of the other suitable resins described herein), or may each be selected to comprise different resins (i.e., in any desirable combination) from any of the suitable resins described elsewhere herein.

In one exemplary embodiment, such a particle may have an in situ Young's modulus of about 5,000,000 psi and be constructed as follows: Core of 12% by weight of total weight of particle of BORDEN 500-series resin ("569C") mixed with 80% by weight of total weight of particle of 6 micron (or 6 to 10 micron) "MINEX 4" particles; and having an outside layer of 8% by weight of total weight of BORDEN 700-series resin ("794"), or alternatively "SIGMASET LV" resin. Included in this embodiment are particles available from BJ SERVICES and having the tradename "FLEXSAND™" or "FLEXSAND™ MS" at the time of filing of this application Manufacture of the disclosed embodiments of multi-component particles may be by any suitable method known in the art. For example, agglomerate particles may be formed by mixing particles such as "MINEX" with 500-series resin in an industrial mixer having internal screens, flash firing the resulting particles (e.g., to about 1500° F.) to cure the 500-series resin. If desired, a coating of, for example, 700-series resin, "SIGMASET LV" resin, cold cure resin, or other suitable resin may then be applied and cured as appropriate for the selected resin type to form an agglomerate particle having an outer coating or layer. In other embodiments, one or more layers of coatings may be applied using any coating method known in the art to a selected embodiment of core material described elsewhere herein. Coatings may be applied directly, or where required or desirable, binder materials/compositions known to those of skill in the art may be used to enhance ease of application or to enhance integrity of an applied layer/s to a core or underlying layer of selected material.

Further information on types of multi-component particles may be found in U.S. Pat. No. 6,059,034, U.S. patent application Ser. No. 09/519,238 filed Mar. 6, 2000; U.S. patent application Ser. No. 09/579,146 filed May 25, 2000; and in U.S. patent application Ser. No. 09/579,147 filed May 25, 2000, each of which is incorporated herein by reference.

In another embodiment, a multi-component particle may include a first substantially elastic material and at least one additional, or second, different substantially elastic material. The first and second substantially elastic materials may have different values of in situ Young's modulus and/or be of differing composition. Alternatively, the first and second substantially elastic materials may have similar or same values of in situ Young's modulus and/or be of similar or same composition. In one embodiment, a second substantially elastic material may be present as a protective layer around a first substantially elastic material, as described further herein. In another embodiment, a second substantially elastic material may be present to alter the overall modulus of a substantially elastic particulate formed therefrom.

Whether agglomerated, layered or in other form, multi-component substantially elastic particles may be employed in any of the shapes and sizes described elsewhere herein as being suitable for other forms or embodiments of substantially elastic materials. Moreover, such particles may be employed in amounts and with types of hydraulic cements as described elsewhere herein for other types of substantially elastic materials. It will also be understood with benefit of this disclosure by those of skill in the art that selection of multi-component particle elastic characteristics may be made based on anticipated cementing conditions such as temperature and/or pressure or compressional forces (including pressure due to desired weight of cement). Such characteristics include, but are not limited to, core and layer materials of a layered particle, layer and core thicknesses of a layered particle, types and relative percentages of substantially elastic and substantially non-deformable and/or substantially non-elastic materials employed in an agglomerated multi-component particle, porous or non-porous nature of elastic materials, etc. Furthermore, manufacture of the disclosed embodiments of multi-component particles may be by any suitable method known in the art. In this regard, one or more layers of coatings may be applied using any coating method known in the art to a selected embodiment of core material described elsewhere herein. Coatings may be applied directly, or where required or desirable, binder materials/compositions known to those of skill in the art may be used to enhance ease of application or to enhance integrity of an applied layer/s to a core or underlying layer of selected material.

Cementing Compositions and Methods

In the practice of one embodiment of the disclosed method, a dry cement composition may comprise substantially elastic material in BWOC amounts described elsewhere herein. As described elsewhere herein, varying types and mixtures of substantially elastic material and/or hydraulic cements may be employed. For example, amounts and forms of the above-mentioned materials may be selected to vary cement performance to fit particular cementing conditions (e.g., downhole conditions) using methods known to those of skill in the art. For example, the amount of substantially elastic particles employed may vary due to downhole temperature, pressure and other design parameters, including maximum shrinkage that an external casing packer ("ECP") can experience while still maintaining zonal isolation. For example, some ECP models may tolerate higher amounts of shrinkage due to element thickness and other material properties. In such cases, relatively lesser amounts of substantially elastic particles may be employed relative to hydraulic cement.

In the practice of the disclosed method, cement slurry compositions may be formed by combining dry mixtures of substantially elastic material and hydraulic cement with aqueous mixing fluid. An aqueous mixing fluid may be any aqueous fluid suitable for formulating a cement slurry. For example, a dry cement mixture may be combined with fresh water, but may also be mixed with seawater or any other suitable fluid (e.g., suitable aqueous oil field fluid) including, but not limited to, formation brine, KCl water, NaCl water, seawater, drill water, drilling mud, or mixtures thereof. The water requirement of a cement slurry may be varied to achieve desired density and pumpability. In this regard, any amount of water suitable for forming a cement slurry having density and pumpability suitable for a particular application (e.g., for inflating and setting an inflatable packer within a wellbore, etc.) may be employed. In one embodiment, an ultimate cement slurry composition contains greater than about 30% BWOC of water, alternatively from about 40% to about 60% BWOC of water, depending on desired pumpability. However, amounts greater or lesser than these ranges may be employed as well.

In the practice of the disclosed method, cement slurries including substantially elastic materials may be formulated to have a wide range of slurry densities. With benefit of this disclosure, those of skill in the art will understand that slurry density and other slurry properties may be varied using methods and/or additives known in the art of cementing. It will also be understood that elastic properties of particulate materials may dictate use of a particular type of material depending, for example, on the desired density of cement and/or on the resulting hydrostatic forces existing under in situ conditions.

In one exemplary embodiment, a cement slurry for use in wellbore cementing may be formulated with a slurry density of from about 2.28 g/cm$^3$ (19 lbm/gal) to about 1.2 g/cm$^3$ (10 lbm/gal), and/or with a fresh water requirement of from about 200% BWOC to about 25% BWOC. Alternatively, in another embodiment, such a slurry may be formulated to have a slurry density of about 1.98 g/cm$^3$ (16.5 lbm/gal) with a fresh water requirement of about 46% by weight of cement ("BWOC"). However, any other slurry density suitable for wellbore cementing, including inflating and setting an inflatable packer in a wellbore may also be employed, including values outside the above given ranges.

Although exemplary densities are given above, cement slurries having slurry densities outside the ranges given above may be formulated and employed, and may be tailored to fit particular cementing applications, be they related to wellbore cementing, construction cementing, etc. Furthermore, it will be understood with benefit of this disclosure that slurry density may be further increased or decreased by the addition of commonly used cement additives, or any other additives suitable for modifying density. Such additives include low density additives (microspheres, bentonite, sodium silicate/metasilicate, nitrogen, etc.) and weighting agents (barite, hematite, salt, sand, etc.). For example, a cement slurry containing substantially elastic material may be formulated to have a slurry density between about 8 lbm/gal (0.96 g/cm$^3$) (using nitrogen) and about 18 lbm/gal (1.56 g/cm$^3$) and about 17 lbm/gal (2.04 g/cm$^3$) to about 22 lbm/gal (2.64 g/cm$^3$) (using hematite). It will be understood that these values are exemplary only.

The disclosed cement compositions may be formulated to set or harden, for example, in from about 1 to about 30 hours, depending on temperature and additives. Suitable set retarder additives for this purpose include, but are not limited to, sodium decaborate, sodium pentaborate, sodium gluconate, gluconic acid, other similar materials, mixtures thereof, etc.

Longer or shorter hardening times may also be acceptable, depending on a specific application. Other additives such as carboxymethyl hydroxyethyl cellulose, hydroxyethyl cellulose, and 2-acrylamido 2-methylpropane sulfonic acid (available as "AMPS" from Lubrizol) in co- or ter-polymer forms, may be used to vary viscosity, control fluid loss, immobilize the water between particles, or to impart thixotropic properties to a cement slurry. Other additives may also employed, including low density additives (such as microspheres), weighting agents (such as barite, hematite, sodium chloride, magnesium chloride, calcium bromide), dispersants, accelerators, anti-settling agents (such as welan gum), etc. Thickening times of cement compositions comprising substantially elastic material may be influenced by factors similar to those affecting thickening times of Portland cement, including temperature, pressure and density.

In operation, cement compositions containing substantially elastic materials may be mixed and handled in manners similar to that employed for conventional cements. For example, in well cementing applications the disclosed cement compositions may be mixed and pumped, or otherwise introduced into a wellbore, with conventional mud or cementing equipment, and may be used to inflate and set an inflatable packer or for other wellbore cementing purposes, in a manner similar to that employed with conventional wellbore cements. Furthermore the disclosed cement compositions may be mixed and pumped in any manner known to those of skill in the wellbore cementing art including, but not limited to, by continuous mixing, batch mixing, etc. A dry cement composition comprising substantially elastic material and hydraulic cement may be prepared, for example, at a bulk plant and then transported and/or stored prior to use.

Figure 4:
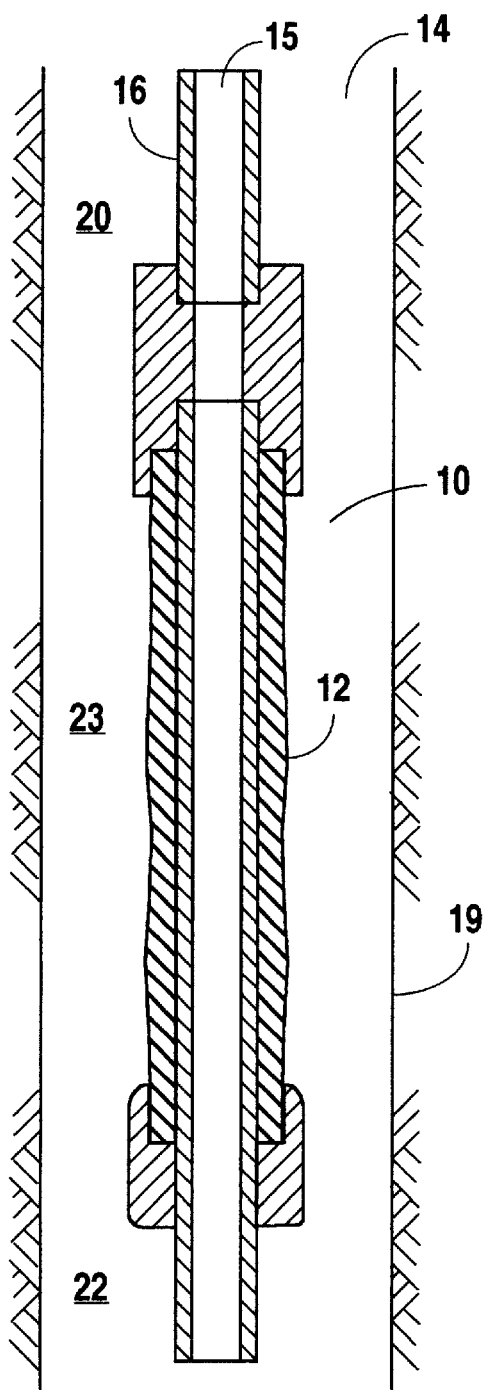
FIG. 4 is a simplified cross-sectional view of an inflatable packer suspended from a pipe string in a wellbore according to one embodiment of the disclosed method.

In one embodiment of the disclosed method illustrated in FIG. 4, an inflatable packer 10 having at least one elastomeric packer element 12 is run into a wellbore 14 on a pipe string 16 (e.g., casing) and set at a selected depth within the wellbore 14. Elastomeric packer element 12 may optionally be provided with metal reinforcing bands. In this case, wellbore 14 is illustrated as an open hole, however it may also be a cased hole. A packer setting depth may be chosen, for example, to provide zonal isolation, prevent migration of gas or other fluids, or to otherwise eliminate fluid or pressure communication between upper wellbore annular space 20 in the area above the packer setting depth and lower wellbore annular space 22 in the area below the packer setting depth.

Figure 2:
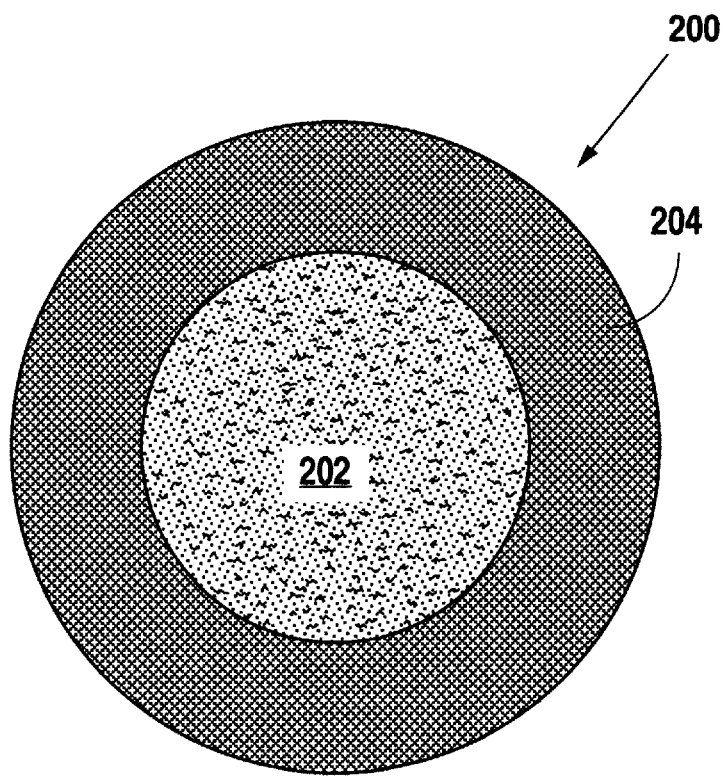
FIG. 2 is a representation of a layered beaded particle including a substantially nondeformable core surrounded by a substantially elastic coating or layer according to one embodiment of the disclosed method.
Figure 3:
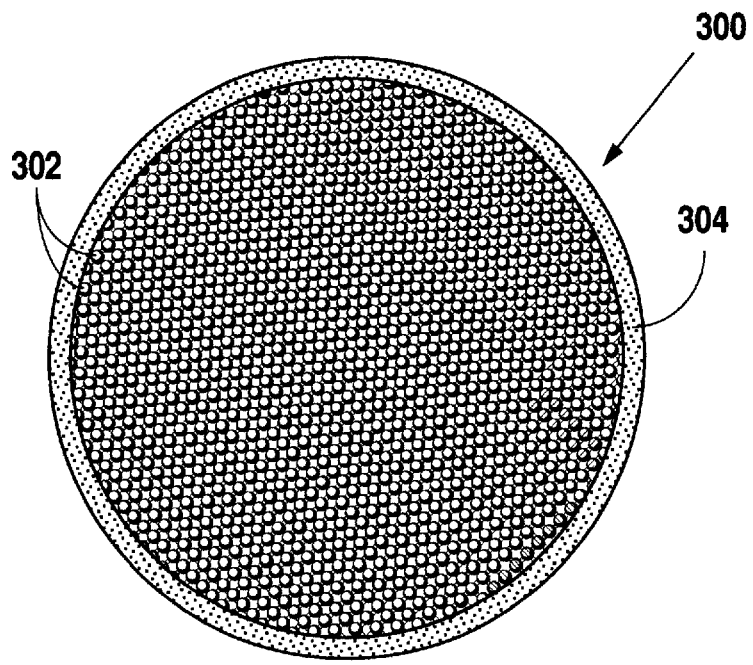
FIG. 3 is a representation of an agglomerated beaded particle including substantially non-deformable components surrounded and intermixed with substantially elastic material according to one embodiment of the disclosed method.
Figure 5:
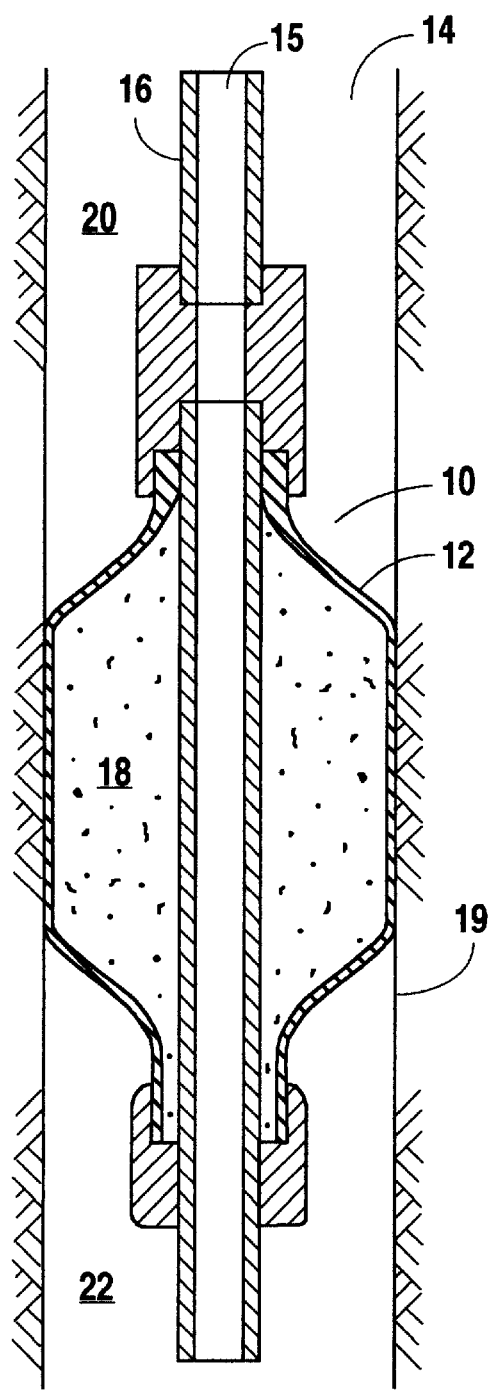
FIG. 5 is a simplified cross-sectional view of the inflatable packer of FIG. 4 in an to inflated sealing condition according to one embodiment of the disclosed method.

Next, as shown in FIG. 5, the pipe may be cemented within wellbore 14 by pumping a cement slurry composition containing substantially elastic material down the interior 15 of the pipe string 16 using conventional cement pumping techniques known to those of skill in the art. At the appropriate determined time, the cement slurry is directed from the pipe string 16 into the interior 18 of the elastomeric packer element, typically by a valving system (not shown) within the packer that acts to establish fluid communication between the interior 15 of the pipe string 16 and the interior 18 or inner surface of the packer element 12. The packer element 12 is then inflated to sufficient pressure with cement slurry to expand it from within and to effect a positive seal with wellbore wall 19 by substantially eliminating the intermediate annular space 23 formed between the outer surface of packer element 12 and the interior (or wall) 19 of the wellbore 14, as illustrated sequentially in FIGS. 1 and 2. The cement slurry is then allowed to cure. Advantageously, a positive seal between the outer surface of an inflatable packer element 12 and borehole wall 19 is substantially maintained during and after curing of the cement by virtue of the substantially elastic material present in the cement composition. Thus, in one embodiment, a method for substantially eliminating fluid and/or pressure communication between the wellbore annular spaces above and below an inflatable packer element is provided. In addition, other phenomenon associated with the inflation of packers using conventional cement, such as the formation of a microannulus, may be substantially inhibited or prevented.

Although one embodiment involving an inflatable packer run on casing within an open borehole is described above, the disclosed cement compositions may be used to inflate an inflatable packer used in any of a number of inflatable packer applications known to those of skill in the art, including using any type of inflatable packer that is suitable for inflation with standard cements. Specific inflatable packer applications include, but are not limited to, single element inflatable packers, multi-element inflatable packers, multi-stage inflatable packers, straddle packer combinations (using multiple inflatable packers spaced apart by a section of pipe to straddle a borehole interval), completion systems employing multiple inflatable packers, and completions made through perforations in an inflatable packer (in lieu of a straddle packer installation). The disclosed cement compositions may also be employed with types of inflatable packers as described above, but run on a tubing string rather than casing and/or set within a string of casing rather than in open hole. Other suitable applications include, but are not limited to, inflatable packers run on liners, and inflatable packers run through a production string or liner and set within a larger diameter open or cased hole below the production string or liner seat.

EXAMPLES

The following examples are illustrative and should not be construed as limiting the scope of the invention or claims thereof.

Cement Expansion Model Examples

Figure 6:
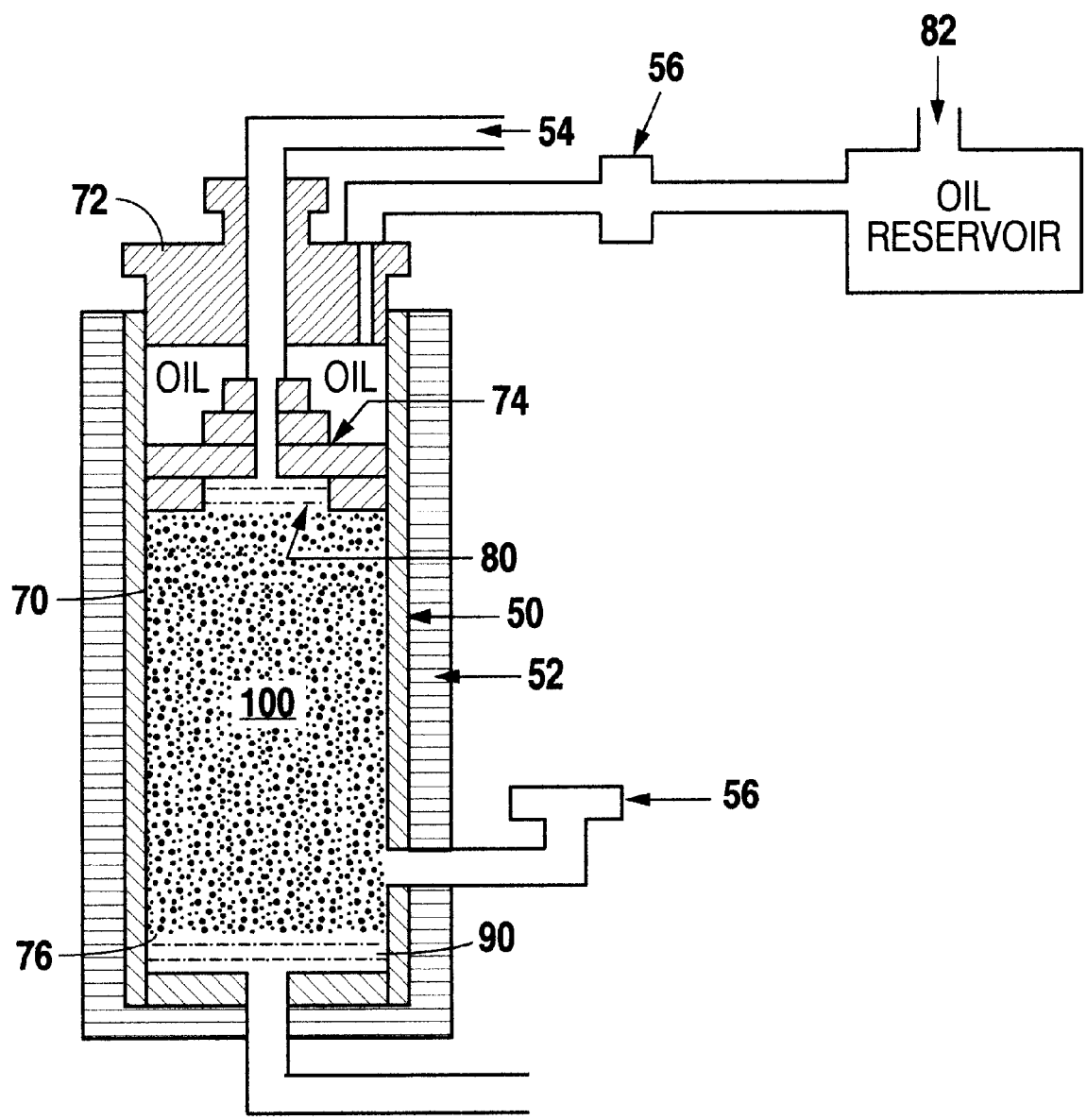
FIG. 6 is a simplified schematic of a test apparatus used in conducting Examples 1–4, and Comparative Examples A and B.

For Examples 1–4 and Comparative Examples A–B, a cement expansion model was constructed to simulate a typical well configuration in which a cement slurry is exposed to its own hydrostatic pressure. A simplified schematic of the expansion model is shown in FIG. 6.

The model consisted of test cell 50, heating jacket 52, pressurized nitrogen gas source 54, pressure transducers 56, and (not shown) load cells, a linear variable differential transducer ("LVTD"), a data acquisition unit ("DAU"), and a computer. The test cell 50 consisted of test cylinder 70, top head assembly 72, floating piston 74 and bottom assembly 76. The floating piston 74 allows for volume compensation of liquid and set cement.

For each example, the floating piston 74 was fitted with an aluminum disk 80 and loaded into test cylinder 70. Nitrogen gas pressure 54 was then applied. The top head assembly 72 was then fitted into the top of the test cylinder 70 and hydraulic oil pressure 82 applied to the top of the piston to represent slurry hydrostatic pressure.

Next, each slurry design was mixed according to API Spec 10 and conditioned in an atmospheric or pressurized consistometer. After conditioning, each slurry 100 was transferred into the expansion model and an aluminum disk 90 was loaded into the bottom assembly 76 of the test cylinder. The test cell assembly was installed into the pre-heated jacket 52 and a hydrostatic pressure 82 of 1000 psi, and gas pressure 54 of 500 psi were applied during each run. Hydrostatic pressure, cement pore pressure, piston movement and temperature were automatically monitored using the computer. Test data, including cement pore pressure, filtrate volume, water displaced by filtrate and/or gas volume are reflected in the attached graphs (FIGS. 7–12).

In each of the following examples, shrinkage characteristics of a cement slurry sample was evaluated. By noting the plunger position after thermal equilibrium had been reached compared to the plunger position at the end of the test, a measure of the volumetric expansion or shrinkage of the sample was made. As may be seen in the figures, an initial thermal expansion of each slurry typically occurred due to heating of the test cell, followed by reduction in bulk volume. In each example, thermal equilibrium was determined to be at a point where the temperature variance was +/−2 degrees and less. The plunger position at the end of the test was determined as the stabilized plunger position as reflected on the plot of plunger movement for each example. Shrinkage was calculated as the value of plunger movement (i.e., initial plunger position minus final plunger position)

divided by the initial plunger position, and is expressed as a percentage value.

Examples 1–2 and Comparative Example A

In the following example, two embodiments of Class H cement slurry compositions containing 10% and 20% BWOC of 60/80 mesh polystyrene divinylbenzene beads having 4% divinylbenzene crosslinker were tested and compared to a conventional Class H cementing system containing no substantially elastic material. Characteristics of the conventional slurry of Comparative Example A (Slurry #1) and the slurries containing the PSDVB beads of Examples 1 and 2 (Slurries #2 and #3, respectively) are presented in Tables 2 and 3. Components of the slurry systems are listed in Table 3. Slurry properties, testing conditions, etc. are presented in Table 3.

TABLE 2

Slurry Component Data
(All percentages of cement composition components given are BWOC)

| SLURRY #1 of Comparative Example A | SLURRY #2 of Example 1 | SLURRY #3 of Example 2 |
|---|---|---|
| Joppa Class H Cement 38% BWOC mix water (fresh water) | Joppa Class H Cement 10% BWOC of 4% PSDVB Beads 38% BWOC mix water (fresh water) | Joppa Class H Cement 20% BWOC of 4% PSDVB Beads 38% BWOC mix water (fresh water) |

TABLE 3

Slurry Properties and Test Results

| Slurry Properties | Slurry #1 | Slurry #2 | Slurry #3 |
|---|---|---|---|
| Density, pound per gallon ("ppg") | 16.5 | 15.6 | 14.95 |
| Yield, cubic feet per sack ("cu.ft./sk.") | 1.05 | 1.19 | 1.32 |
| Mixing water, gallon per sack ("gal/sk.") | 4.29 | 4.29 | 4.29 |
| Water type: | Fresh | Fresh | Fresh |
| Approximate Time to Thermal Equilibrium (hours:minutes) | 1:30 | 1:30 | 2:00 |
| Approximate Time to Plunger Stabilization (hours:minutes) | 1:15 | 1:15 | 1:30 |
| % Cement Shrinkage (Plunger Movement/Initial Plunger Position) | 2.02 | 0.74 | 0.27 |

Figure 7:
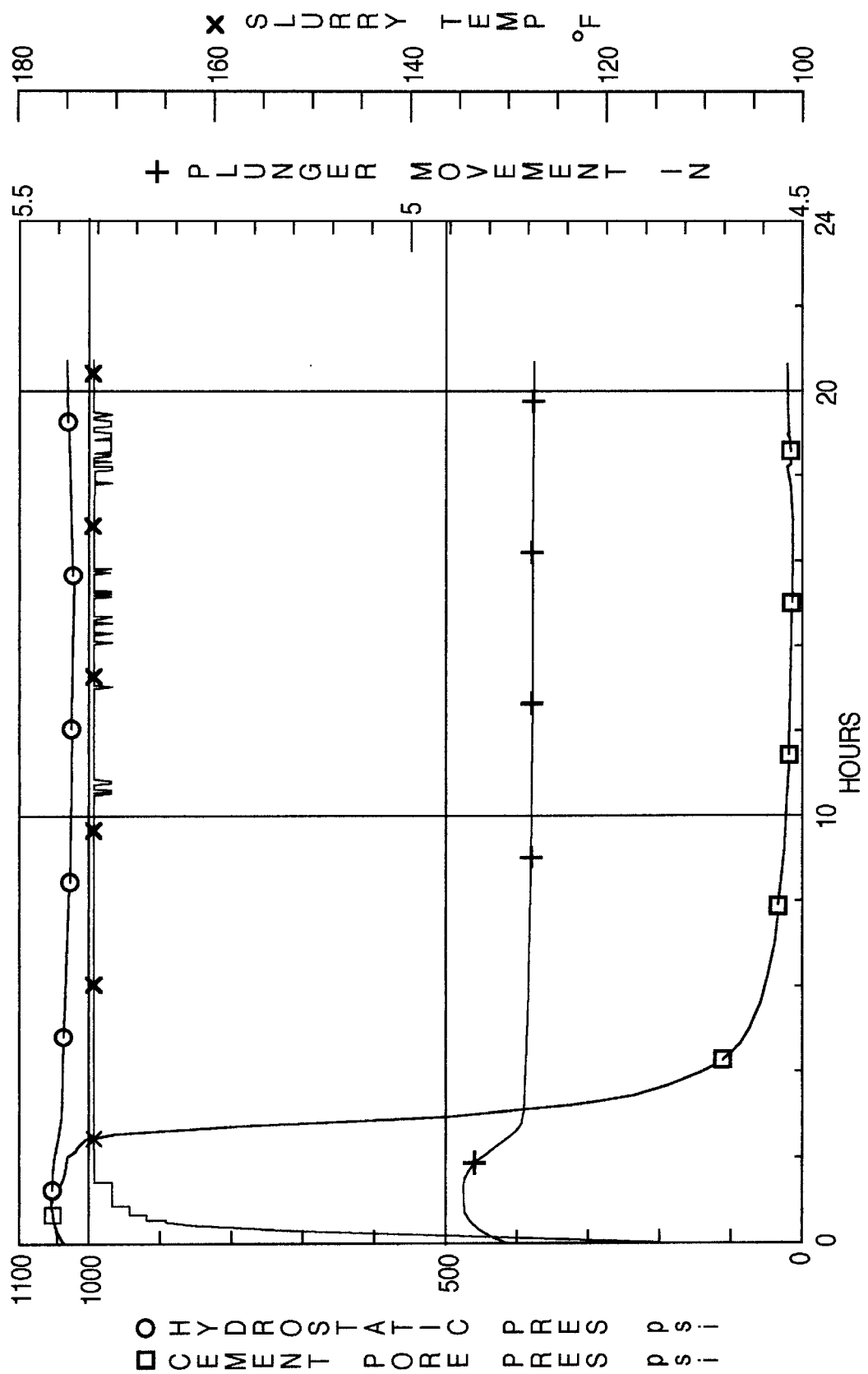
FIG. 7 shows cement pore pressure, hydrostatic pressure, slurry temperature and plunger movement for the conventional cement slurry of Comparative Example A.
Figure 8:
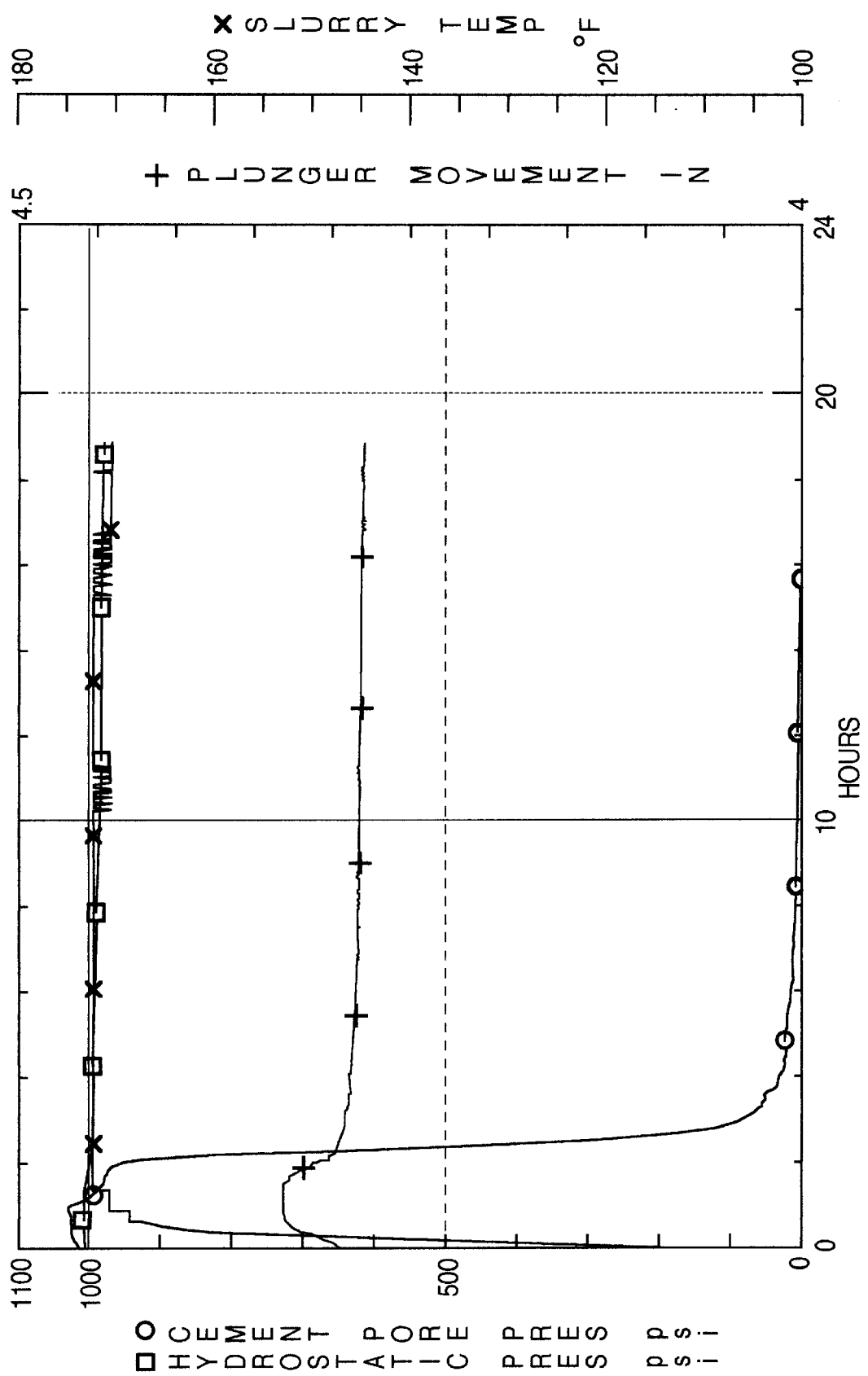
FIG. 8 shows cement pore pressure, hydrostatic pressure, slurry temperature and plunger movement for the cement slurry of Example 1, according to one embodiment of the disclosed method and compositions.
Figure 9:
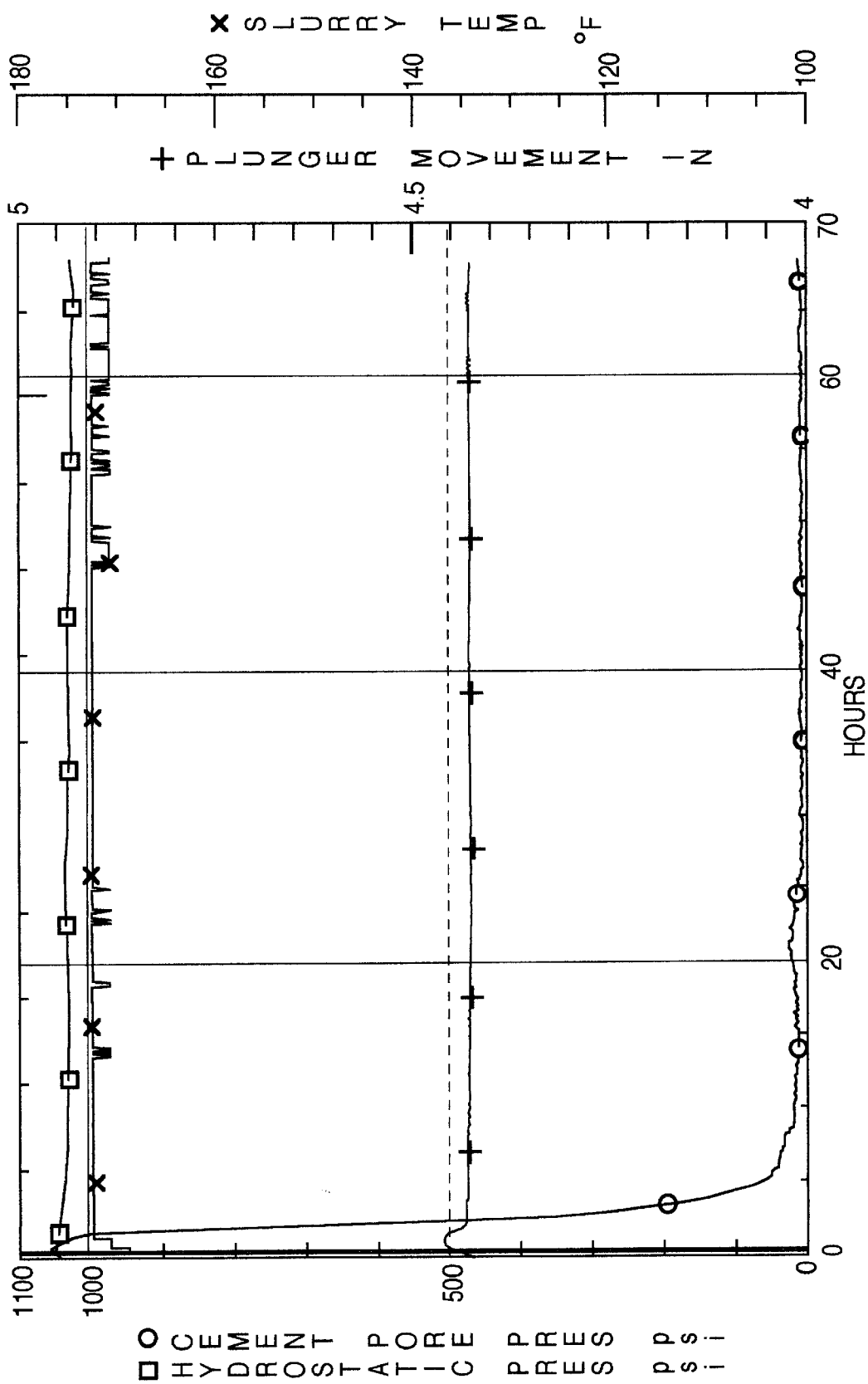
FIG. 9 shows cement pore pressure, hydrostatic pressure, slurry temperature and plunger movement for the cement slurry of Example 2, according to one embodiment of the disclosed method and compositions.

FIGS. 7, 8 and 9 show the expansion characteristics over time (during curing) for Slurry #1, Slurry #2, and Slurry #3, respectively. As can be seen in FIG. 7, Slurry #1 which includes no elastic material exhibited a shrinkage of approximately 2.02% after approximately 21 hours. In comparison, FIG. 8 shows that Slurry #2, which includes 10% PSDVB according to one of the disclosed embodiments, exhibited a shrinkage limited to 0.74% at approximately 19 hours (as can be seen in FIG. 8, plunger movement essentially ceased after approximately 7 hours). FIG. 9 shows that Slurry #3, which includes 20% PSDVB according to another of the disclosed embodiments, exhibited a shrinkage limited to 0.27% at approximately 68 hours (as can be seen in FIG. 9, plunger movement essentially ceased after approximately 9 hours). This data indicates that the elastic material minimized shrinkage associated with the setting of the cement, and that increasing the amount of elastic material in a cement slurry composition results in further minimization of shrinkage.

Example 3 and Comparative Example B

In the following example, one embodiment of a Class H cement slurry composition containing 30% BWOC 60/80 mesh polystyrene divinylbenzene beads having 4% divinylbenzene crosslinker was tested and compared to a conventional Class H cementing system containing no substantially elastic material. Characteristics of the conventional slurry of Comparative Example B (Slurry #4) and the slurry containing the PSDVB beads of Example 3 (Slurry #5) are presented in Tables 4 and 5. Components of the slurry systems are listed in Table 4. Slurry properties, testing conditions, etc. are presented in Table 5.

TABLE 4

Slurry Component Data
(All percentages of cement composition components given are BWOC)

| SLURRY #4 of Comparative Example B | SLURRY #5 of Example 3 |
|---|---|
| LeHigh Class H Cement 35% S-8 silica flour 0.1% CD-32 ethoxylated napthalene sulfonate dispersant 0.05% ASA-301 welan gum (anti-settling agent) 46.5% BWOC mix water (fresh water) | LeHigh Class H Cement 30% of 4% BWOC PSDVB Beads 35% S-8 silica flour 0.1% CD-32 ethoxylated napthalene sulfonate dispersant 0.05% ASA-301 welan gum (anti-settling agent) 46.5% BWOC mix water (fresh water) |

TABLE 5

Slurry Properties and Test Results

| Slurry Properties | Slurry #4 | Slurry #5 |
|---|---|---|
| Density, ppg | 16.5 | 14.79 |
| Yield, cu.ft./sk. | 1.38 | 1.79 |
| Mixing water, gal/sk. | 5.25 | 5.25 |
| Water type: | Fresh | Fresh |
| Expansion Characteristics | | |
| Approximate Time to Thermal Equilibrium (hours:minutes) | 2:00 | 2:00 |
| Approximate Time to Plunger Stabilization (hours:minutes) | 1:15 | 1:45 |
| % Cement Shrinkage (Plunger Movement/Initial Plunger Position) | 1.53 | 0.065 |

Figure 10:
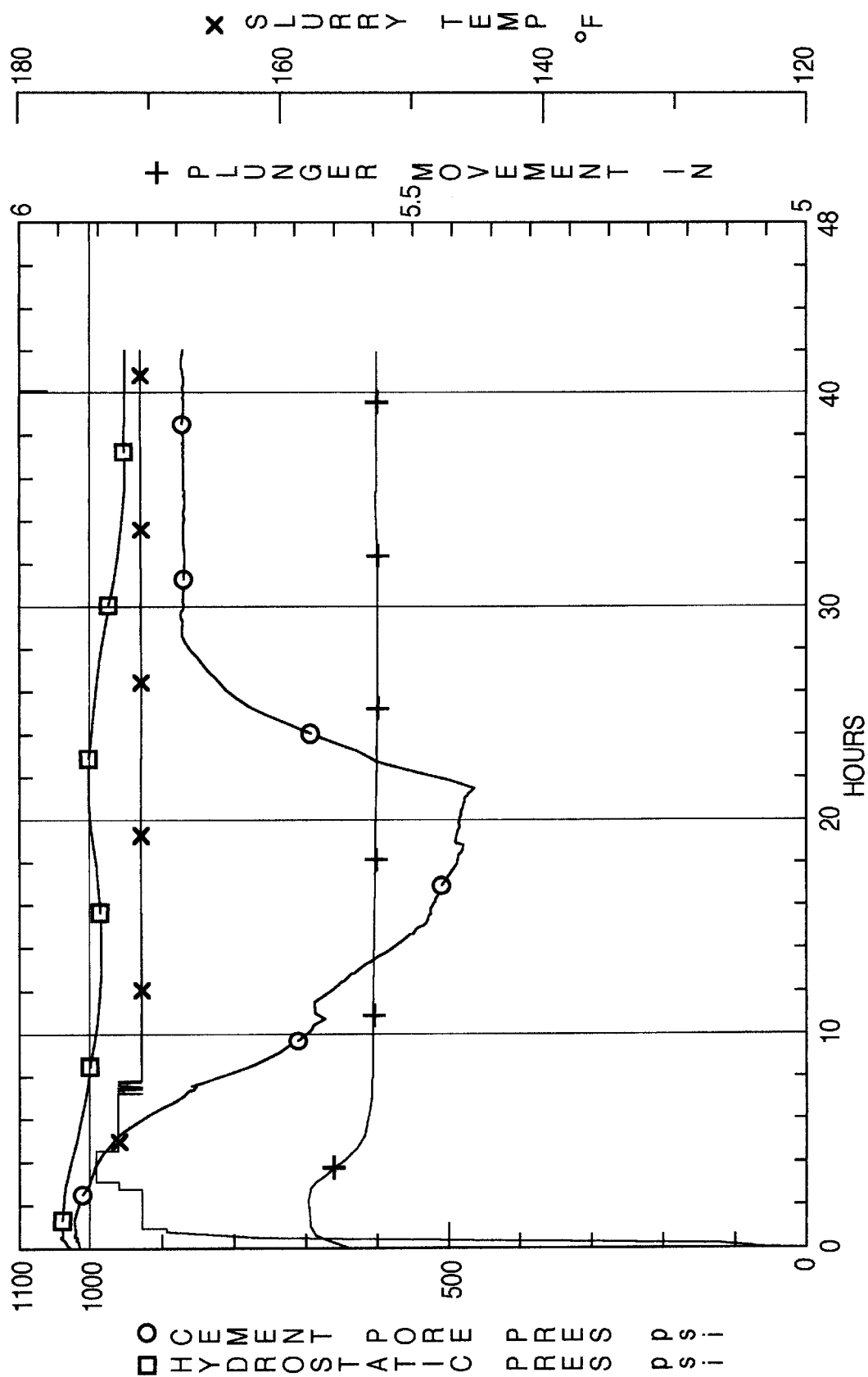
FIG. 10 shows cement pore pressure, hydrostatic pressure, slurry temperature and plunger movement for the conventional cement slurry of Comparative Example B.
Figure 11:
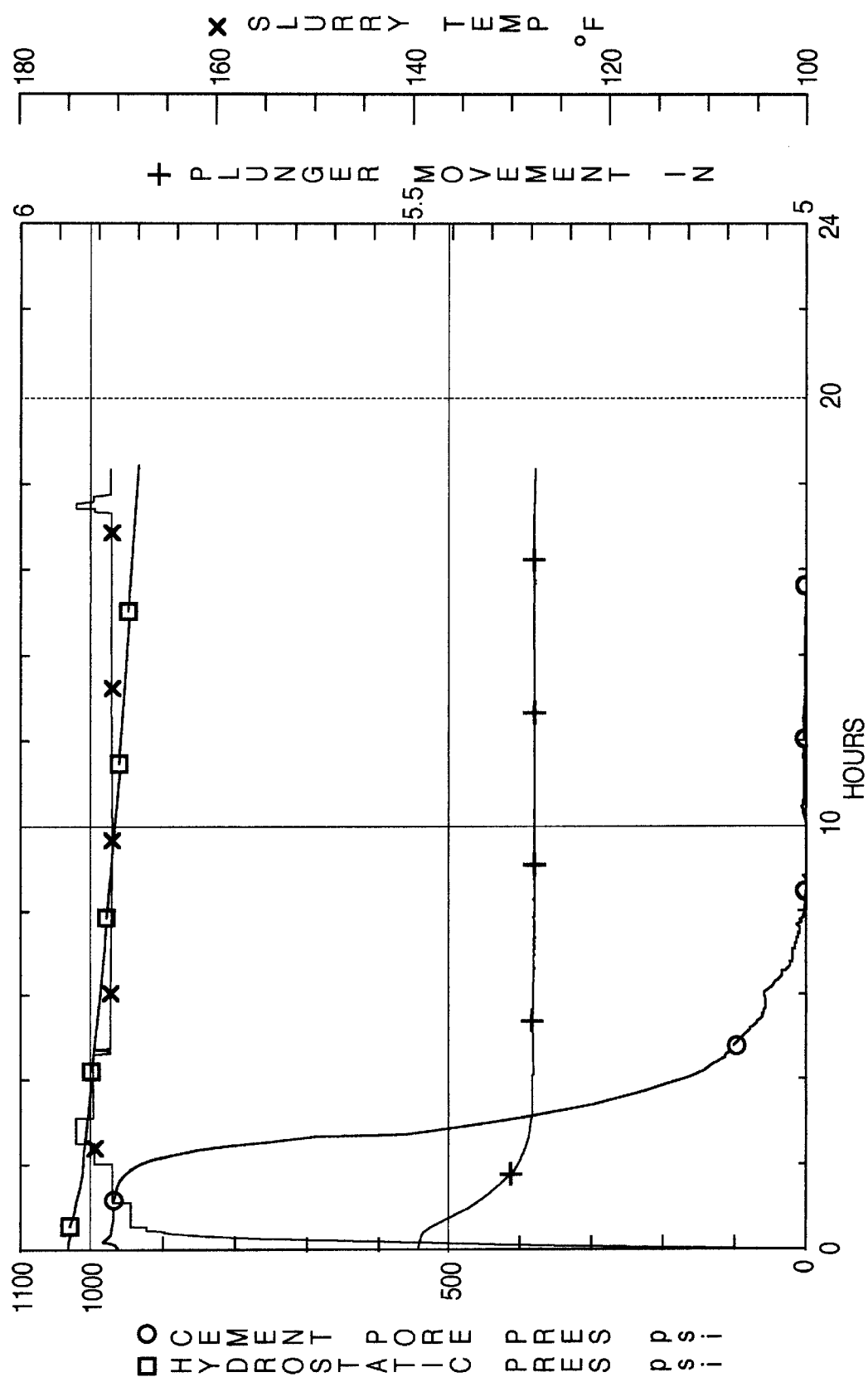
FIG. 11 shows cement pore pressure, hydrostatic pressure, slurry temperature and plunger movement for the cement slurry of Example 3, according to one embodiment of the disclosed method and compositions.

FIG. 10 and FIG. 11 show the expansion characteristics over time (during curing) for Slurry #4 and Slurry #5, respectively. As can be seen in FIG. 10, Slurry #4 which includes no elastic material exhibited a shrinkage of approximately 1.53% after approximately 42 hours (as can be seen in FIG. 10, plunger movement essentially ceased after approximately 7 hours). In comparison, FIG. 11 shows that Slurry #5, which includes PSDVB according to one of the disclosed embodiments, exhibited a shrinkage limited to 0.065% at approximately 18 hours (as can be seen in FIG. 11, plunger movement essentially ceased after approximately 5 hours), indicating that the elastic material minimized shrinkage associated with the setting of the cement.

Example 4

In the following example, one embodiment of a Class H cement slurry composition containing 30% by weight 60/80 mesh fine polystyrene divinylbenzene beads having 4% divinylbenzene crosslinker was tested. Characteristics of the slurry (Slurry #6) are presented in Table 6 and 7. Components of the slurry system are listed in Table 6. Slurry properties, testing conditions, etc. are presented in Table 7. Density was allowed to fluctuate while keeping water constant.

TABLE 6

Slurry #6 Component Data
(All percentages of cement composition components given are BWOC)

SLURRY COMPONENTS

Joppa Class H Cement
35% S-8 silica flour
0.1% CD-32 ethoxylated napthalene sulfonate dispersant
0.05% ASA-301 welan gum (anti-settling agent)
30% BWOC of 60/80 mesh 4% PSDVB beads

TABLE 7

Slurry #6 Properties and Test Results

Slurry Properties

| | |
|---|---|
| Density, ppg | 14.79 |
| Yield, cu.ft./sk. | 1.79 |
| Mixing water, gal/sk. | 5.25 |
| Water type: | Fresh |

Expansion Characteristics

| | |
|---|---|
| Approximate Time to Thermal Equilibrium (hours:minutes) | 2:30 |
| Approximate Time to Plunger Stabilization (hours:minutes) | 2:00 |
| % Cement Shrinkage (Plunger Movement/Initial Plunger Position) | 0.08 |

Figure 12:
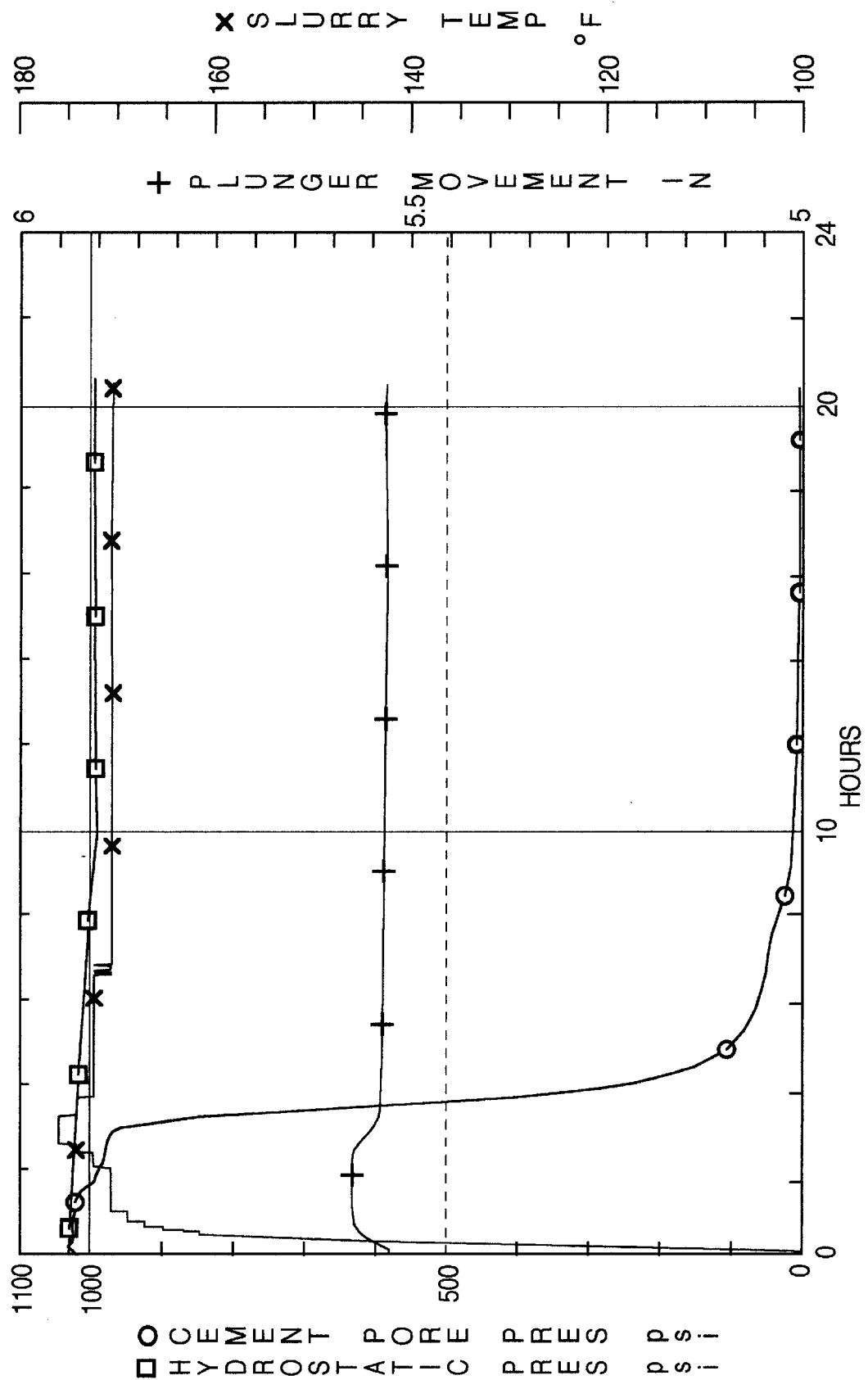
FIG. 12 shows cement pore pressure, hydrostatic pressure, slurry temperature and plunger movement for the cement slurry of Example 4, according to one embodiment of the disclosed method and compositions.

FIG. 12 shows the expansion characteristics over time (during curing) for Slurry #6 of Example 4. As can be seen in FIG. 12, the slurry, which includes PSDVB according to one of the disclosed embodiments, exhibited a shrinkage limited to 0.08% at 20 hours (as can be seen in FIG. 12, plunger movement essentially ceased after approximately 5 hours), indicating that the elastic material minimized shrinkage associated with the setting of the cement.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the methods and compositions may be utilized in various combinations and/or independently. Thus the invention is not limited to only those combinations shown herein, but rather may include other combinations. Furthermore, as used herein the indefinite articles "a" and "an" connote "one or more."

What is claimed is:

1. A method of cementing, comprising placing an uncured cement composition in a selected location and allowing said cement composition to cure to form a cured cement composition; wherein said uncured cement composition comprises a mixture of hydraulic cement and substantially elastic material, and wherein said substantially elastic material is present in said uncured cement composition in an amount effective to at least partially counteract volumetric shrinkage of said cement composition during said curing.

2. The method of claim 1, wherein said substantially elastic material comprises a material that under in situ cementing conditions is capable of at least partially recovering size of shape upon reduction in an external force and after deformation of said material caused by exposure to said external force.

3. The method of claim 1, wherein said uncured cement composition is allowed to cure in a substantially closed system.

4. The method of claim 3, wherein said selected location is within a subterranean wellbore.

5. The method of claim 1, wherein said selected location is within a subterranean wellbore.

6. The method of claim 5, wherein upon curing in the absence of external water said cured cement composition exhibits a net shrinkage in bulk volume of less than about 1% as compared to the bulk volume of said uncured cement composition.

7. The method of claim 5, wherein said substantially elastic material comprises polystyrene divinylbenzene.

8. The method of claim 5, wherein said substantially elastic material comprises polystyrene divinylbenzene beads.

9. The method of claim 5, wherein said substantially elastic material comprises substantially elastic particulate material that is capable of at least partially compressing or deforming in response to in situ compressional forces exerted on said substantially elastic particulate material in said wellbore prior to or during said curing of said cement composition, and that is further capable of at least partially expanding or recovering size or shape upon a reduction in said in situ compressional forces during said curing; wherein volumetric shrinkage of said cement composition occurs during said curing; and wherein said substantially elastic particulate material is present in said uncured cement composition in an amount effective to at least partially counteract said volumetric shrinkage of said cement composition during said curing.

10. The method of claim 9, wherein within said wellbore at least a portion of the individual particles of said substantially elastic particulate material each have a respective first volume at in situ wellbore cementing conditions prior to curing of said cement slurry; and wherein said at least a portion of the individual particles of said substantially elastic particulate material each have a respective second volume at in situ wellbore cementing conditions after said curing of said cement slurry to form said cured cement composition, said second volume being larger than said first volume so as to at least partially counteract said volumetric shrinkage of said cement slurry during said curing.

11. The method of claim 10, further comprising placing said uncured cement slurry into a substantially closed system within said wellbore and allowing said cement slurry to cure within said substantially closed system to form said cured cement composition.

12. The method of claim 9, further comprising placing said uncured cement slurry into an annular space existing between two concentric strings of pipe, and allowing said cement slurry to cure within said annular space to form said cured cement composition; or further comprising placing said uncured cement slurry into an inflatable packer positioned within said wellbore, and allowing said cement slurry to cure within said inflatable packer to form said cured cement composition.

13. The method of claim 9, further comprising placing said uncured cement slurry into an inflatable packer positioned within said wellbore, and allowing said cement slurry to cure within said inflatable packer to form said cured cement composition.

14. The method of claim 13, wherein upon curing in the absence of external water said cured cement composition exhibits a net shrinkage in bulk volume of less than about 1% as compared to the bulk volume of said uncured cement slurry.

15. The method of claim 13, wherein said substantially elastic particulate material comprises polystyrene divinylbenzene particles.

16. The method of claim 13, wherein said substantially elastic particulate material comprises polystyrene divinylbenzene beads.

17. The method of claim 13, wherein said substantially elastic particulate material comprises individual particles, each of said individual particles comprising two or more components.

18. The method of claim 13, wherein at least a portion of said individual particles of said substantially elastic particulate material comprise at least one of an agglomerate of substantially non-elastic material and substantially elastic material; a core of substantially non-elastic material surrounded by at least one layer of substantially elastic material; or a mixture thereof.

19. The method of claim 13, wherein said substantially elastic particulate material comprises individual particles; wherein each of at least a portion of said individual particles comprises at least one of a core component of a first material surrounded by at least one layer component of second material, or a first material impregnated with second material, or a mixture thereof; wherein said first material of said particles comprises at least one of ground or crushed nut shells, ground or crushed seed shells, ground or crushed fruit pits, processed wood, or a mixture thereof; and wherein said second material comprises a substantially elastic material.

20. The method of claim 9, wherein said substantially elastic particulate material has a Young's modulus of from about 500 psi to about 2,000,000 psi at in situ cementing conditions.

21. The method of claim 1, wherein said placing comprises inflating an inflatable packer positioned within a subterranean wellbore with said uncured cement composition.

22. The method of claim 21, wherein said substantially elastic material comprises substantially elastic particulate material that is capable of at least partially compressing or deforming in response to in situ compressional forces exerted on said substantially elastic particulate material in said wellbore prior to or during said curing of said cement composition, and that is further capable of at least partially expanding or recovering size or shape upon a reduction in said in situ compressional forces during said curing; wherein said inflatable packer is coupled to a pipe suspended within a subterranean wellbore and has at least one elastomeric packer element with an inner surface disposed in fluid communication with said string of pipe; and wherein said method further comprises:
  expanding said packer element with an uncured cement slurry by pumping said uncured cement slurry down said string of pipe and into said packer element; and
  allowing said uncured cement slurry to cure within said expanded packer element to form a cured cement composition.

23. The method of claim 22, wherein said substantially elastic particulate material has a Young's modulus of from about 500 psi to about 2,000,000 psi at in situ cementing conditions.

24. The method of claim 22, wherein upon curing in the absence of external water said cured cement composition exhibits a net shrinkage in bulk volume of less than about 1% as compared to the bulk volume of said uncured cement slurry.

25. The method of claim 22, wherein said substantially elastic particulate material comprises particles of polystyrene divinylbenzene.

26. The method of claim 25, wherein said particles of polystyrene divinylbenzene comprise from about 0.1% to about 14% divinylbenzene crosslinker by weight.

27. The method of claim 26, wherein said uncured cement slurry comprises from about 10% to about 30% BWOC of said particles of polystyrene divinylbenzene.

28. The method of claim 27, wherein said particles of polystyrene divinylbenzene comprise polystyrene divinylbenzene beads.

29. The method of claim 22, wherein said substantially elastic particulate material comprises individual particles, each of said individual particles comprising two or more components.

30. The method of claim 22, wherein at least a portion of said individual particles of said substantially elastic particulate material comprise at least one of an agglomerate of substantially non-elastic material and substantially elastic material; a core of substantially non-elastic material surrounded by at least one layer of substantially elastic material; or a mixture thereof.

31. The method of claim 22, wherein said substantially elastic particulate material comprises individual particles; wherein each of at least a portion of said individual particles comprises at least one of a core component of a first material surrounded by at least one layer component of second material, or a first material impregnated with second material, or a mixture thereof; wherein said first material of said particles comprises at least one of ground or crushed nut shells, ground or crushed seed shells, ground or crushed fruit pits, processed wood, or a mixture thereof; and wherein said second material comprises a substantially elastic material.

32. The method of claim 22, wherein said expanding includes expanding said packer element sufficiently to form a positive seal between said packer element and a wall of said wellbore, and wherein said allowing includes allowing said uncured cement slurry to cure so that said positive seal is maintained between said packer element and said wellbore wall after said cement slurry is cured.

33. A method of cementing, comprising placing an uncured cement composition in a selected location and allowing said cement composition to cure to form a cured cement composition; wherein said uncured cement composition comprises a mixture of hydraulic cement and a particulate material; and wherein said particulate material is substantially elastic and comprises at least one of:
  a material having a Young's modulus of between about 500 psi and about 30,000,000 psi at in situ cementing conditions, or
  individual particles, each of said individual particles comprising two or more components, or
  a mixture thereof.

34. The method of claim 33, wherein said particulate material comprises a substantially elastic material having a Young's modulus of between about 500 psi and about 30,000,000 psi at in situ cementing conditions.

35. The method of claim 33, wherein said particulate material comprises at least one of:
  an agglomerate of substantially non-elastic material and substantially elastic material, or a core of substantially non-elastic material surrounded by at least one layer of substantially elastic material, or a mixture thereof.

36. A method of cementing, comprising placing an uncured cement composition in a selected location and allowing said cement composition to cure to form a cured cement composition; wherein said uncured cement composition comprises a mixture of hydraulic cement and a particulate material, said particulate material comprising polystyrene divinylbenzene.

37. The method of claim 36, wherein said selected location is within a subterranean wellbore.

38. The method of claim 37, wherein said polystyrene divinylbenzene particulate material is present in said uncured cement composition in an amount effective to at least partially counteract volumetric shrinkage of said cement composition during curing.

39. The method of claim 38, wherein said uncured cement composition is allowed to cure in a substantially closed system.

40. The method of claim 38, wherein said placing comprises inflating an inflatable packer positioned within said subterranean wellbore with said uncured cement composition.

41. The method of claim 40, wherein said polystyrene divinylbenzene particulate material comprises polystyrene divinylbenzene beads.

42. The method of claim 40, wherein upon curing in the absence of external water said cured cement composition exhibits a net shrinkage in bulk volume of less than about 1% as compared to the bulk volume of said uncured cement composition.

43. The method of claim 15, wherein particles of said polystyrene divinylbenzene particulate material comprise from about 0.1% to about 14% divinylbenzene crosslinker by weight.

* * * * *

UNITED STATES PATENT AND TRADEMARK OFFICE
CERTIFICATE OF CORRECTION

PATENT NO.    : 6,508,305 B1
DATED         : January 21, 2003
INVENTOR(S)   : Brannon et al.

It is certified that error appears in the above-identified patent and that said Letters Patent is hereby corrected as shown below:

<u>Title page,</u>
Item [75], add inventors -- Philip J. Rae and Gino A. DiLullo --

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,508,305 B1
DATED : January 21, 2003
INVENTOR(S) : Brannon et al.

It is certified that error appears in the above-identified patent and that said Letters Patent is hereby corrected as shown below:

<u>Title page,</u>
Item [75], inventor, after "Harold D. Brannon," delete "Spring" and substitute
-- Magnolia --

Signed and Sealed this

Twenty-fourth Day of February, 2004

JON W. DUDAS
*Acting Director of the United States Patent and Trademark Office*